US010637378B2

(12) United States Patent
Wangemann et al.

(10) Patent No.: US 10,637,378 B2
(45) Date of Patent: Apr. 28, 2020

(54) CONTROL DEVICE FOR A POLYPHASE MOTOR AND METHOD FOR DRIVING A POLYPHASE MOTOR

(71) Applicants: Airbus Defence and Space GmbH, Taufkirchen (DE); Airbus Operations GmbH, Hamburg (DE)

(72) Inventors: Joerg Wangemann, Magdeburg (DE); Heiko Rothkranz, Osdorf (DE); Jens Schult, Hamburg (DE)

(73) Assignees: Airbus Defence and Space GmbH (DE); Airbus Operations GmbH (DE)

(*) Notice: Subject to any disclaimer, the term of this patent is extended or adjusted under 35 U.S.C. 154(b) by 0 days.

(21) Appl. No.: 15/834,574

(22) Filed: Dec. 7, 2017

(65) Prior Publication Data

US 2018/0175753 A1 Jun. 21, 2018

(30) Foreign Application Priority Data

Dec. 7, 2016 (DE) .................. 10 2016 123 715

(51) Int. Cl.
*H02M 3/335* (2006.01)
*H02P 6/18* (2016.01)
(Continued)

(52) U.S. Cl.
CPC .......... *H02P 6/183* (2013.01); *H02M 7/5395* (2013.01); *H02M 7/53871* (2013.01);
(Continued)

(58) Field of Classification Search
CPC ............ H02M 7/53871; H02M 7/5395; H02P 2203/11; H02P 25/22; H02P 27/08; H02P 6/085; H02P 6/183
See application file for complete search history.

(56) References Cited

U.S. PATENT DOCUMENTS 5,194,796 A * 3/1993 Domeki .................. H02P 8/14
318/685
2003/0193306 A1 10/2003 Griffitts
(Continued)

FOREIGN PATENT DOCUMENTS

DE 102011004817 A1 12/2011
DE 102012013652 A1 11/2013
DE 102012222311 A1 6/2014

OTHER PUBLICATIONS

Cicily Antony T. et al., "Fault Tolerant Capability of Five Phase BLDC Motor with Ten Step Commutation", the International Journal of Advanced Research in Electrical, Electronics and Instrumentation Engineering, vol. 3, Special Issue 5, Dec. 2014, pp. 374-381.
(Continued)

*Primary Examiner* — Muhammad S Islam
(74) *Attorney, Agent, or Firm* — Lerner, David, Littenberg, Krumholz & Mentlik, LLP

(57) ABSTRACT

An actuating apparatus for a polyphase motor includes five phase terminals for connecting of in each case one phase of the polyphase motor, a high terminal for applying a supply voltage ($U_B$), a low terminal for applying a reference potential of the supply voltage ($U_B$), a control device, wherein the control device is adapted, in four of the five phase terminals, to impress a pulse-width-modulated voltage pattern by connecting the phase terminals to the high terminal or the low terminal so that in the first phase terminal, an evaluation signal which is dependent on the angle of rotation of the polyphase motor is produced, and wherein the control device is adapted to determine the angle of rotation and/or a commutation condition of the polyphase motor from the evaluation signal.

13 Claims, 3 Drawing Sheets

(51) Int. Cl.
  *H02P 6/08* (2016.01)
  *H02M 7/5387* (2007.01)
  *H02M 7/5395* (2006.01)
  *H02P 27/08* (2006.01)
  *H02P 25/22* (2006.01)

(52) U.S. Cl.
  CPC .............. *H02P 6/085* (2013.01); *H02P 25/22* (2013.01); *H02P 27/08* (2013.01); *H02P 2203/11* (2013.01)

(56) References Cited

U.S. PATENT DOCUMENTS

| | | | |
|---|---|---|---|
| 2007/0031131 | A1 | 2/2007 | Griffitts |
| 2011/0221367 | A1* | 9/2011 | Perisic .............. H02M 7/53871 318/400.02 |
| 2014/0028237 | A1 | 1/2014 | Park et al. |
| 2014/0152219 | A1 | 6/2014 | Niederer et al. |
| 2015/0054441 | A1 | 2/2015 | Schwarzkopf |
| 2015/0270797 | A1* | 9/2015 | Roesner ................. G01R 25/00 318/400.04 |
| 2017/0019043 | A1 | 1/2017 | Zhao et al. |

OTHER PUBLICATIONS

Gamaz-Real et al., "Position and Speed Control of Brushless DC Motors Using Sensorless Techniques and Application Trends", Department of Signal Theory, Communications and Telematic Engineering, University of Valladolid, from the journal sensors 2010,10, ISSN 1424-8220, Published Jul. 19, 2010, pp. 6901-6947.

George et al., "A Comparison of Three Phase and Five Phase BLDC Motor", the International Journal of Advanced Research in Electrical, Electronics and Instrumentation Engineering, vol. 2, Special Issue 1, Dec. 2013, pp. 479-486.

http://www.ti.com/lit/ml/sprt647/sprt647.pdf, "Breakthrough InstaSPIN™-FOC motor control technology is here!", Texas Instruments, Copyright 2013, 3 pages.

Kennel et al., "Sensorless Position Control of Permanent Magnet Synchronous Machines without Limitation at Zero Speed", IECON 02 [Industrial Electronics Society, IEEE 2002 28th Annual Conference of the], p. 674-679, vol. 1, ISBN 0-7803-7474-6, Nov. 5, 2002.

Kennel et al., "Sensorless speed and position control of synchronous machines using alternating carrier injection", Electric Machines and Drives Conference, 2003, IEMDC'03, IEEE International, vol. 2, p. 1211-1217, vol. 2, ISBN 0-7803-7817-2, Jun. 1, 2003.

López et al., "Multilevel Multiphase Space Vector PWM Algorithm", IEEE Transactions on Industrial Electronics, vol. 55, No. 5, May 2008, pp. 1933 to 1942.

Reill, Josef, the dissertation "Position-sensorless control for an accelerometer-supported, highly dynamic robot drive system with a permanently excited synchronous motor", Dr. Hut Verlag, ISBN 978-3-86853-495-5, Jun. 2010, Chapters 6 and 7.

Wang et al., "Position Self-Sensing Evaluation of Novel CW-IPMSMs with an HF Injection Method", IEEE Transactions on Industry Applications, vol. 50, No. 5, Sep./Oct. 2014, pp. 3325-3334.

Wangemann, Jörg et al., https://github.com/joewa/bldc-strip/blob/master/README.md, Jul. 2016, 7 pages.

* cited by examiner

CONTROL DEVICE FOR A POLYPHASE MOTOR AND METHOD FOR DRIVING A POLYPHASE MOTOR

FIELD OF THE INVENTION

The present invention relates to the technical field of aviation and aerospace. In particular, the present invention relates to an actuating apparatus for a polyphase motor and to a method for actuating a motor.

BACKGROUND OF THE INVENTION

Brushless direct current motors ensure that a rotational movement is maintained in that, after a specific angle of rotation has been covered, they ensure that the direction of current is reversed. This reversal of the direction of current is referred to as commutation. In order to be able to commutate at the right time, sensors, for example a Hall sensor, are provided in direct current motors and make it possible to evaluate the current angle of rotation. However, there are also variants which manage without sensors and, in this case, use the existing phases by means of skilled actuation to determine the current rotary position of the rotor in relation to the stationary stator by means of the electromotive force (EMF) produced by induction.

In the case of brushless direct current motors or synchronous motors, the rotor field and stator field must be adapted to one another, i.e. the fields must be synchronous and thus also change together with the speed.

Furthermore, it is possible to distinguish direct current machines comprising current reverser (commutators) and brushes from brushless direct current machines (brushless DC motor, BLDC) which are constructed in the manner of a three-phase synchronous machine. Three-phase synchronous machines can be excited electrically or by means of permanent magnets. In the case of electrically excited synchronous machines, the energy transmission into the rotor can also take place by means of slip rings and brushes.

Since the commutation point in time in the case of sensorless direct current motors takes place according to the induction and/or the EMF and/or the rotor angle, special effort is required to start up the motor from standstill, to slowly rotate it or to brake it.

The article 'Position and Speed Control of Brushless DC Motors Using Sensorless Techniques and Application Trends' by Jose Carlos Gamazo-Real et. al., 19 Jul. 2010, Department of Signal Theory, Communications and Telematic Engineering, University of Valladolid, from the journal sensors 2010, ISSN 1424-8220, deals with the position and speed control of brushless direct current motors.

The dissertation 'Position-sensorless control for an accelerometer-supported, highly dynamic robot drive system with a permanently excited synchronous motor' by Josef Reill, Dr. Hut Verlag, ISBN 978-3-86853-495-5, June 2010, in chapter 6 describes an EMF (electromotoric force) process which is used only above a minimum turning rate (number of revolutions) of the machine, at which rotational speed the induced voltage is present at a sufficient amplitude, and in chapter 7 describes a test signal process.

The article 'Position Self-Sensing Evaluation of Novel CW-IPMSMs with an HF Injection Method' by Xiaocan Wang et. al. in IEEE Transactions on Industry Applications, vol. 50, No. 5, September/October 2014 relates to a synchronous machine comprising permanent magnets which uses an HF injection process.

The document https://github.com/joewa/blde-strip/blob/master/README.md from July 2016 describes a project by Jorg Wangemann, Heiko Rothkranz et. al. for electronic speed control for a brushless DC motor (brushless DC, BLDC).

The article 'Fault Tolerant Capability of Five Phase BLDC Motor with Ten Step Commutation' by Cicily Antony T et. al. from the International Journal of Advanced Research in Electrical, Electronics and Instrumentation Engineering, vol. 3, Special Issue 5, December 2014 describes a ten-step commutation logic for a BLDC motor which has five phases and a Hall sensor and compares the results with a four-phase and three-phase motor.

The document http://www.ti.com/lit/ml/sprt647/sprt647.pdf from the year 2013, USA, with document number SPRT647, describes the InstaSPIN™ FOC (field oriented control) control technology from Texas Instruments for synchronous (e.g. BLDC) or asynchronous (e.g. AC induction) motors which use the FAST™ (flux, angle, speed, torque) technology.

The article 'A Comparison of Three Phase and Five Phase BLDC Motor' by Kiran George et. al. from the International Journal of Advanced Research in Electrical, Electronics and Instrumentation Engineering, vol. 2, Special Issue 1, December 2013, describes the ripple of a five-phase BLDC motor in comparison with a three-phase motor.

The article 'Sensorless speed and position control of synchronous machines using alternating carrier injection' by Ralph Kennel et. al. from the Electric Machines and Drives Conference, 2003, IEMDC'03, IEEE International, volume 2, p. 1211-1217, vol. 2, ISBN 0-7803-7817-2, 1 Jun. 2003, proposes a specific injection scheme using predefined injection angles.

The article 'Sensorless Position Control of Permanent Magnet Synchronous Machines without Limitation at Zero Speed' by Ralph Kennel et. al. from IECON 02 [Industrial Electronics Society, IEEE 2002 28th Annual Conference of the], volume 1, p. 674-679, vol. 1, ISBN 0-7803-7474-6, 5 Nov. 2002, describes a sensorless control algorithm for SMPMS machines (surface mounted permanent magnet synchronous machines) which uses a high-frequency voltage injection.

The article 'Multilevel Multiphase Space Vector PWM Algorithm' by Óscar López et al., IEEE TRANSACTIONS ON INDUSTRIAL ELECTRONICS, VOL. 55, NO. 5, May 2008, pages 1933 to 1942 describes the use of more than three phases in drive devices, in particular an expression for calculating a duty cycle of a two-level converter.

SUMMARY OF THE INVENTION

It may be desirable to allow efficient operation of a direct current motor.

According to one aspect of the present invention, an actuating apparatus for a motor, a motor control system, a method for actuating a motor, a program element and a computer-readable storage medium are described.

The invention is provided by the features of the subject matter of the independent claims. Embodiments and further aspects of the invention are provided by the subject matter of the dependent claims and the following description.

According to another aspect of the present invention, the actuating apparatus for a polyphase motor comprises five phase terminals for connecting of in each case one phase of the polyphase motor, a high terminal for applying a supply voltage, and a low terminal for applying a reference potential of the supply voltage. In one example, a multilevel inverter can be provided for actuation. Furthermore, however, there can also be more than five phase terminals, for example seven or eleven. In addition, the actuating apparatus comprises a control device, a processor or a microcontroller (μC), wherein the control device is adapted to impress a pulse-width-modulated (PWM) voltage pattern in four of the five phase terminals by connecting the phase terminals to the high terminal or the low terminal so that, in the fifth phase terminal, an evaluation signal which is dependent on the angle of rotation of the polyphase motor is produced. In particular, a pattern of the evaluation signal which can be recognised is produced and, as a result of the recognised pattern of the evaluation signal, the angle of rotation or the rotary position of the rotor of the connected motor which angel or position is substantially present at the moment of the detection can be deduced. In one example, each phase terminal is connected either to the high terminal or to the low terminal so that at least one of the high terminal and the low terminal is connected to the phase terminal. A phase terminal which can be operated in this way is operated actively and is referred to as an active phase terminals. A phase terminal in which the evaluation signal is produced is not connected either to the high terminal or to the low terminal. Said terminal is referred to as a passive phase terminal or measuring terminal. By operating separately from a potential, a current may be substantially prevented from flowing in the passive phase terminal. The control device is further adapted to determine the angle of rotation and/or a commutation condition of the polyphase motor from the evaluation signal and/or the pattern of the evaluation signal. The evaluation signal can be a voltage progression, a progression of a voltage differential $\Delta U$ or a progression of a plurality of voltage differentials $\Delta U$.

The series connection of a high switch, a phase terminal and a low switch may be referred to as a bridge branch or half bridge. A plurality of bridge branches may form a bridge circuit.

The commutation condition can be an angle value $\varphi$ and/or a time value t. This value may determine when the motor has to be commutated to effect and/or maintain a rotational movement despite a DC (direct current) voltage being applied. However, the commutation condition can also be a value of a voltage differential $\Delta U$, in particular for example a threshold which has been derived from the voltage differential or a plurality of voltage differentials. Exceeding or falling below the threshold by a current voltage differential value or a plurality of voltage differential values from which a commutation condition can be derived by means of mathematical operations can trigger a commutation during the operation of a motor, that is to say can trigger switching of another phase into a passive state. The actuating apparatus can be in the form of a DC voltage converter, an inverter or a motor control unit (MCU).

The supply voltage may be a DC voltage and can therefore be referred to as a battery voltage $U_B$. The supply voltage can thus also be for example a battery by which the positive pole is connected to the high terminal, and the negative pole is connected to the low terminal.

According to another aspect of the present invention, a motor control system is described which comprises the actuating apparatus according to the invention and a motor having at least five phases, wherein in each case one of the five phase terminals of the actuating apparatus is connected to one of the at least five phases of the motor. However, actuating apparatuses having seven phase terminals or eleven phase terminals can also be provided for motors which are adapted correspondingly. In one example, the number of phases may be determined by prime numbers. Or, in other words, the number of possible phase terminals may be formed by the condition that, after being reduced by the number one, i.e. the number of passive phases, an even number of phase terminals remains, by means of which a symmetrically constructed voltage divider can be formed, that is to say a voltage divider which comprises in each branch the parallel connection of the same number of phases. It may be possible to avoid the number of phase terminals corresponding to a multiple of the phase number of a suitable actuating apparatus having fewer phase terminals. Thus for example an actuating apparatus for six phases corresponds to a multiplication of an actuating apparatus having three phases.

For one rotation in the electrical sense, in the case of a three-phase motor, conventionally six commutations, for a five-phase motor, ten commutations, for a seven-phase motor, 14 commutations, and for an eleven-phase motor, 22 commutations are carried out by means of the actuating apparatus. The point in time of a commutation can be determined by means of the detected commutation condition. The commutation or commutating takes place at the range boundaries of an angular range. Said commutation describes switching the passive phase.

The motor control system forms a motor controller together with a motor. By providing phase terminals for the phase windings of a motor, different types and forms of construction of motors can be connected to the actuating apparatus. In one example, the actuating apparatus may be formed in such a way that it detects the connected motor, in particular it may detect the number of connected phases and the self-inductance of the individual motor phases. The self-inductance of the motors considered in the context of this text may be dependent on the rotor angle. For example in a start interval, the actuating apparatus may also be able to detect the motor parameters of the connected motor in order to be able to forward at least some of said parameters to a control program for controlling the motor and/or for regulating the motor. In one example, the start interval may have five steps. A voltage differential $\Delta U$ which indicates when a specific phase is switched to passive may also be a parameter typical for a motor. In the example of a five-phase motor, the individual measurement curves of the passive phases may be phase-shifted by 36° ((360°/5)/2). For example, when the motor is at a standstill, five interpolation points for a single angle can be determined on five different voltage differential curves. By taking into consideration the phase shift, by means of the formulae for the inductance and the voltage differentials $\Delta U_1$, $\Delta U_2$ the curves of the voltage differentials can be constructed. For the construction, numerical methods, analytical methods and/or table lookup methods can be used. When the voltage differential curve and/or the voltage differential curves have been formed, a commutation parameter can be derived therefrom.

According to one aspect of the present invention, an aircraft comprising the actuating apparatus is provided.

According to yet another aspect of the present invention, a method for actuating a polyphase motor is provided. Said method comprises applying a supply voltage $U_B$ to a high terminal of the actuating apparatus according to the invention. In addition, a reference potential of the supply voltage is applied to a low terminal of the actuating apparatus. The reference potential can be a ground potential GND or a negative terminal of a battery. A pulse-width-modulated voltage pattern is impressed in four of the five phase terminals of the actuating apparatus by connecting the phase terminals to the high terminals or the low terminals. In a fifth phase terminal, an evaluation signal which is dependent on the angle of rotation of the polyphase motor is detected and, by means of this evaluation signal, an angle of rotation and/or a commutation condition of the polyphase motor is determined. In particular, a pattern of the progression of the evaluation signal may be recognised, and the position of the motor may be determined from the pattern. As a commutation condition, a threshold value of a voltage differential may be used, wherein a commutation being carried out when said threshold is fallen below or exceeded.

In other words, four of the five phase terminals are operated as active terminals, and the fifth phase terminal is operated as a passive terminal. For example by induction, in particular by self-induction, in the fifth phase terminal, an output signal arises according to the control sequence for operating the active terminals. Said output signal can have a characteristic shape or a characteristic pattern which can be detected by a control device. From the recognised pattern, for example from two related values of different voltage differentials, the angle of rotation and/or the commutation condition for the rotor of a motor can be determined. In particular, the phase coils may form a voltage divider, the impedance of which may be substantially dependent on the inductances of the phase windings.

In the context of this text, the terms "first phase terminal", "second phase terminal", "third phase terminal", "fourth phase terminal" and "fifth phase terminal" may be used merely as a convention to distinguish between various phase terminals. The physical characteristics of the phase terminals may be substantially the same, and therefore any phase terminal can assume the role of the first phase terminal, the second phase terminal, the third phase terminal, the fourth phase terminal or the fifth phase terminal.

According to another aspect of the present invention, a program element is specified which has a program code which, when executed by a processor and/or by the control device, carries out the method according to the invention.

According to another aspect of the present invention, a computer-readable storage medium is specified, on which a program code is stored and which, when executed by a processor and/or by the control unit, carries out the method according to the invention.

A floppy disc, a hard drive, a USB (universal serial bus) memory device, a RAM (random-access memory), a ROM (read-only memory) or an EPROM (erasable programmable read-only memory) may be used as a computer-readable storage medium. As a memory medium, an ASIC (application-specific integrated circuit) or a FPGA (field-programmable gate array) can also be used, as well as SSD (solid-state-drive) technology or a flash-based storage medium. A web server or a Cloud can also be used as a storage medium. As a computer-readable storage medium, a communications network may also be considered, such as the Internet, which may allow a program code to be downloaded. Wireless network technology and/or wired network technology can be used.

The actuating apparatus can be used for switched reluctance motors (SR drive or SRM). Reluctance motors of this type may have a different number of pronounced and/or salient teeth (salience) on the rotor and stator. The stator teeth are wound with coils. Said coils are organised in individual phases. The phases and thus the coils are switched on and off alternately. The teeth or poles having the current fed windings or the current fed coils, i.e. the active phases, each attract the closest teeth of the rotor in the manner of an electromagnet and are switched off when (or shortly before) the teeth of the rotor are opposite the stator teeth attracting them. In this position or rotary position, the next phase on different stator teeth is switched on which attracts different rotor teeth. The point in times for witching from one phase to the other phase can also be referred to as the commutation point in time or commutation condition In one example, a switched reluctance motor has three, five or more phases which can be connected to the phase terminals of the actuating apparatus. However, an actuating apparatus for a motor can also be constructed with only one or two phases.

In order to switch or commutate at the right point in time, the machine can be provided with a rotor position sensor, for example a Hall sensor. However, the actuating apparatus according to the invention allows the operation of sensorless (or self-sensing) motors. A sensorless control method is thus achieved by means of the actuating apparatus. A sensorless control method can evaluate the stator current, the voltage on phase terminals switched to passive, or the torque of the motor as a commutation condition. The control device may alternatively or additionally evaluate a voltage differential $\Delta U$ between phase switching states as a commutation condition. Reluctance motors which are operated by the actuating apparatus may be characterised by high robustness and low effort for construction. Similarly to an asynchronous machine, a reluctance motor in the non-current fed state during a rotation, for example by an external force, i.e. a manual rotation of the rotor, forms substantially no torque. However, remanent magnetisation may often lead to low cogging torque in the currentless state. At a high rotational speed or at a high number of revolutions, however, by evaluating the current through the phase terminals or the voltage on a phase terminal switched to passive, the setting of the commutation point in time can be efficiently succeeded. Taking into account the voltage differential $\Delta U$ as a commutation condition in the DDIS process can make it possible to determine the commutation point in time very precisely when at a standstill, at low speeds and at medium speeds. In addition, the DDIS process can make it possible to quickly detect the rotary position, which can also allow a fast start up of the rotational movement of the motor in the desired direction.

Generally, a voltage may be induced on the basis of the self-inductance of a coil during a change in current. In one example, a first voltage $U_1$, which may be induced by alternating active phase terminals, may be measured at a branch point of the phase terminal switched to passive, which can be located between the two active phase terminals. Said voltage can be measured either between a star point or Y point of a motor and reference potential or between the phase terminal switched to passive and the reference potential. The measurement may take place on two phase coils connected in parallel. Thereafter, another combination of coils connected in parallel may be formed between the phase terminal and the reference potential, and a voltage $U_2$ may be measured between the phase terminal and the reference potential. The polarity of the active phases may then be reversed in such a way that the coils, which were not involved in determining $U_1$, are connected between the phase terminal and the reference potential, and a third voltage $U_3$ may be detected between the phase terminal and the reference potential. In particular, the measurement may be carried out in such a way that in each case two phase terminals are connected to the reference potential and/or GND, and two other phase terminals are connected to the supply voltage. Subsequently, the polarity of the active phases may then be further reversed in such a way that the coils, which were not involved in determining $U_2$, are connected between the phase terminal and the reference potential, and a fourth voltage $U_4$ may be detected between the phase terminal and the reference potential. A voltage differential $\Delta U1$ or a voltage delta $\Delta U_1$ can be detected from the difference between $U_1$ and $U_3$. A voltage differential $\Delta U_2$ or a voltage delta $\Delta U_2$ can be detected from the difference between $U_2$ and $U_4$.

The effect of an EMF in the passive phase brought about by the magnetic induction of a permanent magnet in motion or a coil may be minor or may be cancelled out when the voltage differential is formed, and therefore said effect becomes substantially unnoticeable in comparison with the effect brought about as a result of the change in current in the case of bipolar actuation of a bridge circuit. Thus, in another example, a first voltage $U_1$ may be determined by alternately activating the phase terminals and in particular the changes in current brought about thereby in the individual bridge circuits. In the case of a changing current i corresponding to $$\frac{di}{dt}$$

an induced voltage $$U = L\frac{di}{dt}$$

is produced (self-inductance). The voltage is proportional to the magnitude of the inductance and the change in current. In the case of a parallel connection of phase coils, the inductance can result as a total inductance from the parallel connection. In this case, the magnitude of the inductance L is dependent on the form of construction of the coil and the flux permeating said coil. In the case of an electric motor, reactances in the form of inductances accrue by the phase windings. The magnitude of the resulting inductances depends for example on the arrangement of the stator relative to the rotor, since the path of the magnetic flux lines can be affected by said arrangement. In particular, distances between the metal cores of the stator and/or the rotor affect the magnitude of the resulting inductance. Since the distances depend on the angles of rotation of the stator relative to the rotor, the inductance is likewise dependent on the angle of rotation. This dependence on distance is expressed as what are known as salience effects and magnetic saturation effects. The fact that, due to the pole windings protrusions accrue on the stator and/or rotor which can lead to changes in the distance and thus to changes in the magnetic fluxes guided by the cores of the poles may be referred to as a salience effect. In the case of the three-phase motor, there are substantially always two active phases, active coils or active phase terminals which are affected differently by the magnetic flux. Therefore, voltage progressions which are different according to the angle of rotation can result on the individual active phases.

When a motor, in particular an electric motor, is to be started or is to rotate slowly, it should be identified in which position the rotor is oriented relative to a stator in order to be able to reverse or commutate the current direction at the right time and/or in order to allow the right force in terms of magnitude and direction to act on the rotor. In the case of a synchronous motor, it is provided for example that the driving magnetic field runs ahead of the rotation of the rotor by 90° in order to pull the rotor behind and to drive the motor by means of said pulling.

In order to control the force which a brushless direct current (DC) motor can apply, the brushless direct current motor can be operated with at least two phases which are switched in an alternating manner by means of a bridge circuit. The alternating switching is referred to as bipolar PWM (pulse width modulation) mode. In this operating mode, a duty cycle between the on time and the off time can be used to control the applied force and speed of the motor.

By means of the alternating operation of the two active phase terminals, the four active phase terminals, or the even number of active phase terminals with a duty cycle of 50%, it can be achieved that, on average, no voltage and no current and thus also no torque is generated in the stationary or slowly rotating motor. The rotational state of the motor may thus be substantially unaffected. Nevertheless, a voltage differential $\Delta U$ can be produced by induction and use of self-induction, from which the current motor position and corresponding commutation behaviour can be derived. In particular, the two $\Delta U$ can be considered a motor characteristic, and the detected values of the voltage differentials $\Delta U$ can be used as a switching threshold for a commutation process. In an other example also a lookup-table may be used. The duty cycle of a five-phase motor can be determined according to the formulae for determining a duty cycle for multilevel inverters.

With four active phases, there are a plurality of possible switching sequences S1, S2, S3, S4 for setting a specific voltage vector. The switching sequence may be designed in such a way that the switching states S1 to S4 follow one another as closely as possible in order to determine the required $\Delta U$.

For example, the operation of a motor can be divided up into a start interval and an operating interval. In the start interval, the motor may be substantially in a standstill or just rotate slowly. In the operating interval, the motor may rotate and apply a torque.

Since one phase of the motor is connected to one phase terminal, the terms "phase" and "phase terminal" can be used synonymously.

In the case of a five-phase motor, there are four active phases and one passive phase. In order to actuate the phase terminals, any desired states can be formed from the individual active phases, which may ensure different changes in current in the active phases. The i-th state duration or even the i-th state of an actuation sequence during which a specific voltage pattern is applied to the active phases may be denoted by SM. Such a state can be a combination of high and low states of the individual active phases. A condition for forming a switching state may be that half of the active phases always have the same allocation selected from a high connection or a low connection, so that consequently each state has the same number of phases connected to high and phases connected to low. Furthermore, each of the active phases can be connected either only to the high terminal or only to the low terminal. As a result, the number h of possible states by which the motor can be actuated is $h=2^{(n-1)/2}$. Thus, in the case of the five-phase (n=5) motor and/or the five-phase actuating apparatus for the five-phase motor, there are four (h=4) possible states, namely S1, S2, S3 and S4. In operation, in addition to the symmetrical states relevant to the measurement, asymmetrical states also may occur, for example when three phases of the four active phases are connected to the reference potential (GND) and one is connected to the supply potential (+). Generally, in the symmetrical case the number of possible states corresponds to the number of different voltage dividers which can be formed in such a way that they comprise parallel connections of phases and the same number of phases is connected to high as to low.

A phase terminal of an active phase which is connected to the high terminal may be denoted by H. A phase terminal of an active phase which is connected to the low terminal may be denoted by L. A phase terminal switched to passive may be denoted by O. The sequence of the state designations of the individual active phases may correspond to the phase number i. Thus, a first state S1 or a first voltage pattern S1, in which the first phase terminal is switched to passive, the second phase terminal is active and connected to the high terminal, the third phase terminal is active and connected to the high terminal, the fourth phase terminal is active and connected to the low terminal, and the fifth phase terminal is active and connected to the low terminal can be abbreviated to S1=O, H, H, L, L. Additional state patterns can be: S2=O, L, H, H, L; S3=O, L, L, H, H; and S4=O, H, L, L, H. These may all be permutations of parallel connections of four coils as voltage dividers. The state duration, that is to say the time for which a state is applied to the phase terminals, is determined by the step duration of the PWM voltage pattern which is to be implemented thereby. By using the PWM, a DC voltage or operating voltage $U_B$ can be converted into an alternating voltage which causes a change in current which in turn generates a voltage by means of the self-induction of the phase windings. This generated voltage depends on the self-inductance of the phase windings, the self-inductance being related to the rotary position of the rotor. The states S1, S2, S3, S4 are passed through sequentially and repeat periodically until another phase terminal is switched to passive, for example because a commutation takes place. In operation, when the states S1, S2, S3, S4 are passed through sequentially, any arbitrary intermediate states can also occur. The step duration for a state S1, S2, S3, S4 may be selected to be long enough for a voltage measurement, for example a few microseconds. The switching sequence S1, S2, S3, S4 and the time durations result from the desired voltage vector and can be ambiguous.

It should be noted that, by using two active phases, by alternately switching between H and L, in the passive phase, a voltage progression can be generated which can be used to determine the position. In particular, a voltage pattern can be generated which can be assigned to a rotary position. Thus, in the case of a three-phase actuating apparatus, by using two active phases, only one curve of a voltage differential $\Delta U$ can be generated in the passive phase. Should two curves be used to increase the precision in determination, then an additional passive phase can be used to effect this second curve and thus to effect an artificial phase shift. When generating the two curves with a three-phase terminal, however, the two curves are chronologically generated one after the other, since in the case of three phases, there is substantially only one passive phase. The expression "one after the other chronologically" may substantially indicate in this case that, when generating two curves, two phases must also be switched to passive at least one after the other, whereas the "simultaneous" generation may mean that the two voltage curves can be generated whilst a single phase is switched to passive.

By using four active phases, however, even two voltage differential curves can be generated simultaneously, that is to say during the time in which precisely just one phase is switched to passive. For example, the voltage differentials $\Delta U_1$ and $\Delta U_2$ can be generated by the combination of switching states during the time interval in which precisely just one phase is switched to passive. Therefore, no phase switching is required to generate two phase-shifted voltage differential curves. However, phase switching can be used to increase the precision of the results. For example, a first voltage differential $\Delta U_1$ can be generated from the voltage values which are effected in the passive phase, whilst the states S1 and S3 apply, and a second voltage differential $\Delta U_2$ can be generated from the voltage values which are effected in the passive phase, whilst the states S2 and S4 apply. The states S1 and S3 respectively S2 and S4 are states which are separated by states which are not involved in forming the voltage differential $\Delta U_1$ respectively $\Delta U_2$. By applying this type of actuation with the switching sequences, the passive phase can be used as an angle sensor in the manner of a resolver to determine the angle of rotation.

In other words, from the active phases, a voltage divider may be formed between a branch point Y, a supply voltage $U_B$ and a reference potential. In this case, the voltage divider may be constructed in such a way that between the supply voltage $U_B$ and the branch point Y, and between the branch point Y and the reference potential, the same number of active phases are interconnected in a parallel connection, after a phase is switched to passive. In the case of a five-phase motor, in each case two phases connected in parallel form the voltage divider. In the case of a seven-phase motor, in each case three phases connected in parallel form the voltage divider. In the case of an eleven-phase motor, in each case five phases connected in parallel form the voltage divider. The number of possible combinations of the voltage divider may indicate the number of possible switching states. Thus, in the case of the five-phase motor, four states can be set by a passive phase. Generally, the question is how many options there are for forming a voltage divider with the number of active phases so that the same number of phases are connected to H as are also connected to L. The number of states is therefore $2^{(n-1)/2}$. In the case of a five-phase motor, the switching states S1 ... S4 can thus be formed, in the case of a seven-phase motor, the switching states S1 ... S8 can be formed, and in the case of an eleven-phase motor, the switching states S1 ... S32 can be formed.

The allocation of the states can take place as desired. In one example of the five-phase motor, an active phase may, on average, in a total of four clock steps, take on an H setting and an L setting of the phase respectively in each case over two clock steps. Thus, in a special case, the ratio of durations for the respective states S1+S3 and/or S2+S4 to the total duration S1+S2+S3+S4 may result in a duty cycle d. However, in order to be able to set a desired voltage vector, other switching states can also occur.

When S1, S2, S3 and S4 are each of the same length, this results in a duty cycle of d=50%. However, a duty cycle of 50% may impress substantially no torque in the rotor and lead to substantially no change in a rotational movement of the motor, and therefore the rotational movement of a motor at standstill or a slowly rotating motor is substantially unaffected. Therefore, a duty cycle of 50% may be referred to as a balanced duty cycle. However, despite the balanced duty cycle, in the passive phase terminal, a voltage differential $\Delta U_1$ and/or $\Delta U_2$ can be determined. Each of these voltage differentials may allow a statement about the ratios of the inductances of the coils of the phases of the motor relative to a stator. The inductances in turn may depend on the orientation or rotary position of the rotor relative to the stator of the motor. Thus, an angle of rotation of the rotor may be derivable from the measured voltage differential $\Delta U$. In consideration of the two voltage differentials together, the rotary position may be determined substantially unambiguously. Since, with this method, the inductance is measured via voltage deltas, that is to say voltage differentials ΔU, the method may be referred to as direct delta inductance sensing (DDIS). The determination can be inserted or induced in substantially each of the commutation cycles. As a result, a normal commutation process may be affected substantially to only a low extent. Therefore, due to the generated duty cycle of 50% and dispensing with the generation of a torque, the DDIS process can be used both when the motor is at standstill and during the rotation and commutation of a motor.

In particular, the determined ΔU may be used as a commutation condition for a commutation process. For this purpose, the ΔU may be stored and transferred to the commutation process. Said ΔU may depend on the type of construction of a motor which is connected to the actuating apparatus. In this way, a commutation process can be automatically adapted to the determined motor parameters.

By measuring a voltage differential, a complex current measurement can be avoided, since the formula $$u = L\frac{di}{dt}$$

indicates that the voltage is dependent on the current progression. A simple voltage sensor system can be used, and no complex current sensors have to be used to measure the inductances. In the case of current sensors, the increase in current would have to be evaluated, but by means of a voltage measurement, the effect may be measured directly and with greater precision. Simple digital-to-analogue converters (DAC) and resistors can be used to carry out a voltage measurement. In particular, by means of the induction formula, the influence of the rotary position on the inductance L can be determined. The inductance L may in turn depend on an angle of rotation. The curves of the voltage differentials $ΔU_1$ and $ΔU_2$ of various voltage divider circuits can thus allow a statement about the rotary position. By forming a voltage differential, a proportion of the measured absolute voltage $U_1$, $U_2$, $U_3$, $U_4$ which is produced by an EMF during the rotation of the rotor by the permanent magnets of the rotor in the phase windings may be eliminated. The EMF can be eliminated by reversing the polarity of the phase windings in the various switching states, since the voltages which have led to the formation of ΔU are determined in the opposite polarity, and therefore the EMF acting in substantially the same manner in all the phase coils is substantially removed. In this manner, curves of progressions of voltage differential values can easily be compared with stored curves, and the current rotary position can be determined with high precision.

According to one aspect of the present invention, the actuating apparatus further comprises a plurality of bridge branches, wherein each bridge branch is connected to one of the five phase terminals in order to impress the pulse-width-modulated voltage pattern in the four of the five phase terminals.

Since one high switch and one low switch are arranged in one of the bridge branches in each case, the state in each of the phases can be controlled independently by using the control unit. By way of the different switching states which can be set by using the high switch and the low switch, firstly an alternating current can be generated which allows the law of induction to be applied. Secondly an EMF, which can accrue in case the DDIS process is used during rotation of the motor, for example in a short injection phase during the commutation process, can also be eliminated. In other words, during a commutation process, it is possible to switch to the DDIS process if the DDIS process itself is not being used as the commutation process.

According to a further aspect of the present invention, each of the bridge branches comprises a series connection of a high switch and a low switch. A high switch of each of the bridge branches is connected to the high terminal, and a low switch of each of the bridge branches is connected to the low terminal. The high and low switches are arranged in the bridge branches or in the half bridges in such a way that each of the five phase terminals is connected between the high switch and the low switch of the respective bridge branch.

This type of connection of the half bridges makes it possible to switch individual phases to active and/or passive.

According to yet another aspect of the present invention, the control device is adapted to impress the pulse-width-modulated voltage pattern in the four active phase terminals of the five phase terminals in such a way that half of the four active phase terminals are connected to the high terminal, and another half of the four active phase terminals are connected to the low terminal.

By means of this connection pattern, it can be achieved that an individual phase is high over two clock steps and is low over two clock steps. In addition, it can be achieved that, per switching state or connection pattern, always different phase coils form a parallel connection of a part of a voltage divider, across which measurements are carried out. However, different allocation states can apply per clock step. In addition, in one example, it can be achieved that per clock step, the state changes in two phases, that is to say for example it is switched from high to low and/or from low to high in order to separate related switching patterns which belong to the same voltage divider. In this way, it can be achieved that two switching states having measurement results which are used to form a voltage differential ΔU are not in chronological proximity and are separated by another switching state. In this way, the number of switching processes can be kept to a minimum, by means of which switching losses are also kept to a minimum. In another example, the connection pattern may be selected in such a way that only states change in phases, which are spaced apart from one another by at least one switching state. Thus, switching does not have to be carried out as often when switching is from state S1 to S2.

According to yet another aspect of the present invention, the pulse-width-modulated voltage pattern is periodically passed through with a predeterminable step duration during a predeterminable first time period. Said pulse-width-modulated voltage pattern is adapted in such a way that connecting of the phase terminals to the high terminal or the low terminal per phase terminal is maintained substantially over two step durations of the pulse-width-modulated voltage pattern.

In this way, it may be ensured that two related phase states change at points in time which are as far apart from one another as possible. Related phase states may refer to two phase states, from the difference of which a voltage curve or an evaluation signal is formed. Related phase states may be characterised in that firstly one half of the active coils form a parallel connection of that part of a voltage divider which part is located between a branch point and a reference potential and then just said half of the coils are connected to the high terminal, i.e. to the supply voltage.

However, intermediate states are also possible in order to take into account a required direction of a voltage vector. Such that it is not always possible to comply with connecting the phase terminals to the high terminal or the low terminal per phase terminal over two step durations of the pulse-width-modulated voltage pattern.

The voltage differential ΔU may be determined from two voltages measured at different points in time with different voltage divider configurations between a branch point of the motor and a reference potential. By reference to the reference potential, the voltage differential can be standardised. In this way, comparison curves can be created in an idle state which curves make it possible to determine the angle of rotation, since all the curves are standardised.

In the case of five phases, two ΔU are determined, in the case of seven phases, three ΔU are determined, and in the case of eleven phases, five ΔU are determined, the ΔU being determined in each case from two voltage measurements.

According to another aspect of the present invention, the evaluation signal has at least two sinusoidal voltage progressions having a phase shift of 90°.

The phase shift may result from the geometry of the motor. In addition, the phase shift may allow precise angle determination. The phase shift of 90° corresponds approximately to the type of signal which would also be obtained from a resolver or angle sensor.

According to another aspect of the present invention, the evaluation signal has a first sinusoidal voltage progression from a voltage differential between two temporally interrupted step durations, or two step durations which do not directly follow one another, the step durations being of the impressed pulse-width-modulated voltage pattern.

By using the sinusoidal voltage progression of the voltage differential in the active phases, a voltage vector can be generated, in the case of which two of the active phases are connected to the high terminal and two of the active phases are connected to the low terminal. In other words, the states change step-by-step according to the clock of the PWM modulation. When each state is applied, a voltage signal can be determined in the passive phase. Two voltage signals, which are interrupted by another state in each case, can be combined to form a differential signal. Thus, two curve progressions of two differential signals can be determined. For comparability, the differential signals can be related to the battery voltage or supply voltage. The states can be selected in such a way that they result in a voltage divider having phases connected in parallel and thus having phase windings of the motor coils connected in parallel. The voltage differential may be formed from parallel connections of the phase windings which have opposite polarities. In the two switching states, from the evaluation signal of which the voltage differential is formed, the identically constructed voltage divider may be reversed in polarity between the supply voltage and the reference potential so that, at different points in time, different connections of the voltage divider are connected to the supply voltage and to the reference potential, respectively.

According to a further aspect of the present invention, the evaluation signal can have a second sinusoidal voltage progression from a voltage differential between two additional non-contiguous step durations of the impressed pulse-width-modulated voltage pattern. The two additional non-contiguous step durations are step durations of the pulse-width-modulated voltage pattern which are different from the step durations on which the first sinusoidal voltage progression is based.

By means of this selection of non-contiguous step durations or switching states, the phase shift between the curves of the voltage differentials can be ensured, which can be used for precise position determination. In other words, at least two differently constructed voltage dividers are reversed in polarity or commutated. In this way, a plurality of voltage differential curves can be formed during just one single phase. In the case of a five-phase motor, two voltage differential curves are formed. In the case of seven phases, for example three voltage differential curves can be formed, and in the case of eleven phases, five voltage differential curves can be formed which can have phase shifts other than 90° relative to one another.

According to another aspect of the present invention, the control device can determine the angle of rotation of the polyphase motor from the first sinusoidal voltage progression and the second sinusoidal voltage progression.

To determine the voltage progressions, the phases connected to the high terminal can be regarded as a parallel connection of the inductances thereof. The parallel connection of the inductances or phase winding can be reversed in polarity to eliminate an EMF. If the progressions of the voltages, in particular the progressions of the voltage differentials, are standardised to a supply voltage, they can be compared with existing curves. An angle of rotation or a rotary position of a rotor can be determined from the existing curves. During this determination, a voltage pattern which corresponds to the measured voltage pattern of the voltage differential curves is detected. The determined $\Delta U_1$ is searched for on the $U_1$-curve, and the $\Delta U_2$ is searched for on the $\Delta U_2$ curve. The point of intersection of these two values with the corresponding axis of rotation angle results in the corresponding rotary position. Alternatively, it is possible to consult a table of the angle of rotation positions.

According to yet another aspect of the present invention, after a predeterminable first time duration, a phase terminal other than the first is used to determine the evaluation signal.

By switching over the passive phase, the rotation of the motor and the commutation linked to the rotation can be continued. By measuring the voltage differentials during another rotary position or during another commutation state, a previously determined rotary position can be verified. It may also be possible to increase the precision of the rotary position determination by means of averaging.

A plurality of phase terminals one after the other can also be used to determine the evaluation signal, for example all five phase terminals one after the other.

According to yet another aspect of the present invention, the actuating apparatus comprises at least two additional phase terminals for connecting in each case one further phase of the polyphase motor. For example, an actuating apparatus can be created with seven phases and/or with eleven phases.

The higher number of phases can contribute to a more precise determination of the angle of rotation.

For example, the control device is adapted to store the voltage differentials, the applied supply voltage, the position of the rotor and/or the commutation condition for the rotation of the motor connected to the phase terminals and/or to provide them to a commutation process.

The storage can take place for example in that a value is assigned to a variable. By storing and/or forwarding a characteristic parameter for/to a commutation process, the commutation process can be adapted to the individual motor parameters of the motor which is currently connected. By means of this automatic adaptation, the same actuating apparatus can be used for various motors substantially without any manual input. It is also possible to exchange the motor without having to manually input the motor parameters in the commutation process. Thus for example a value for a commutation condition, a voltage differential ΔU, ΔU$_1$, ΔU$_2$ and/or a commutation parameter determined in a start interval or a determination interval, which has been determined in a start interval by a corresponding process, can be forwarded to a commutation process. For example, a first process can be suitable for a slow rotation phase of a motor, and another process can be suitable for a rapid rotation phase. By means of the variables and associated memory cells, parameters can be exchanged between the different control processes for the motor or different commutation processes.

For example, the control device may be adapted to switch over to a predeterminable commutation process above a predeterminable turning rate. Thus for example the DDIS process can be combined with a commutation process which is dependent on the phase current.

By measuring the passive phase, the control device can determine the turning rate of a motor connected to the actuating apparatus. When this turning rate exceeds a minimum turning rate required for a predeterminable commutation process, it is possible to switch to this commutation process. A commutation process which is adapted to a low turning rate and a commutation process which is adapted to a high turning rate can thus be combined. The similar applies when transitioning from a high turning rate range to a low turning rate range. The DDIS process may be suitable for low turning rates. However, a process which uses the EMF and/or the phase current to determine rotary position may be very imprecise at low turning rates due to the low EMF and/or due to the minimal influence of the EMF on the current, and does not make it possible to easily determine a point in time for commutation. In the case of the process that uses the phase current, substantially no commutation is used, because the transition and/or the rotation of the target voltage vector is fuzzy and is changed continuously during the rotation, for example in an FOC process. In an FOC process of this type, no phase is switched to passive either, and therefore there are five active phases. In this case, the voltage vector rotates further per PWM step. At a high turning rate, however, the point in time for commutation can be established efficiently by evaluating the EMF. Thus, in one example, a DDIS process can be combined with a process in which the torque is used for commutation.

It should be noted that different aspects of the invention have been described with reference to different subjects matter. In particular, some aspects have been described with reference to apparatus type claims, whereas other aspects have been described with reference to method type claims. However, from the above description and the following description, a person skilled in the art can see that, unless described otherwise, in addition to any combination of features which belongs to one category of subjects matter, any combination of features which relates to different categories of subjects matter can also be considered to be disclosed by this text. In particular, combinations of features from apparatus type claims and features from method type claims are to be disclosed.

BRIEF DESCRIPTION OF THE DRAWINGS

In the following, further exemplary embodiments of the present invention will be described with reference to the drawings.

DETAILED DESCRIPTION OF EMBODIMENTS

The drawings in the figures are schematic and not to scale. In the following description of FIG. 1 to FIG. 8, the same reference signs are used for the same or corresponding elements.

Figure 1:
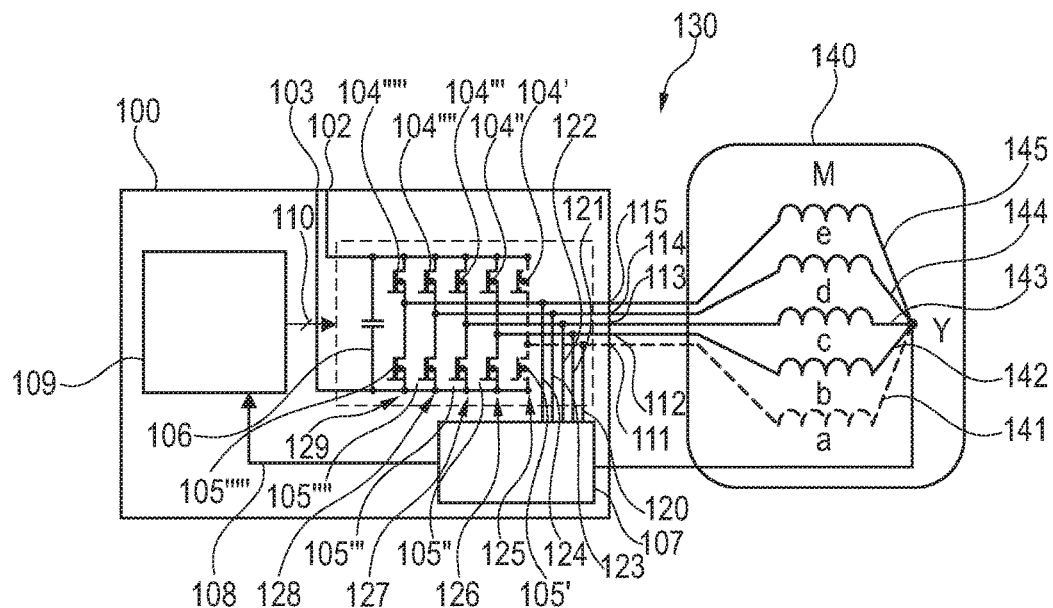
FIG. 1 is a schematic block diagram of an actuating apparatus for a motor according to an exemplary embodiment of the present invention.

FIG. 1 is a schematic block diagram of an actuating apparatus 100 for a motor 140, M according to an exemplary embodiment of the present invention. The motor 140 has five phases 141, 142, 143, 144, 145 having corresponding phase windings a, b, c, d, e. The five phases 141, 142, 143, 144, 145 are interconnected at a common star point Y. The star point Y can, as indicated in FIG. 1, be brought out of the motor housing through a star line 150. However, the connection 150 is often not present. The phases 141, 142, 143, 144, 145 are connected to corresponding phase terminals 111, 112, 113, 114, 115 of the actuating apparatus 100. The star point Y can also be reached via each of the phase terminals 111, 112, 113, 114, 115.

The control apparatus 100 additionally comprises a high terminal 102 and a low terminal 103 for applying a battery voltage U$_B$ (not shown in FIG. 1). The high terminal 102 is connected to a first high switch 104', a second high switch 104", a third high switch 104''', a fourth high switch 104'''' and a fifth high switch 104'''''. A terminal of the high switches 104', 104", 104''', 104'''', 104''''' which in each case is opposite the terminal of the high switch 104', 104", 104''', 104'''', 104''''' which is connected to the high terminal 102, is in each case connected to one of the phase terminals 111, 112, 113, 114, 115. Using this terminal, the series connection of the high switch and the low switch of each bridge branch 125, 126, 127, 128, 129 is produced. The first high switch 104' is consequently connected to the first phase terminal 111, the second high switch 104" is connected to the second phase terminal 112, the third high switch 104''' is connected to the third phase terminal 113, the fourth high switch 104'''' is connected to the fourth phase terminal 114, and the fifth high switch 104''''' is connected to the fifth phase terminal 115. In addition, the first high switch 104' is connected to a first low switch 105', the second high switch 104" is connected to a second low switch 105", the third high switch 104''' is connected to a third low switch 105''', the fourth high switch 104'''' is connected to a fourth low switch 105'''', and the fifth high switch 104''''' is connected to a fifth low switch 105'''''. At the respective connection points at which each high switch is connected to the corresponding low switch, the phase terminal 111, 112, 113, 114, 115 and a measuring terminal 120, 121, 122, 123, 124 are also connected. The measuring terminal 120, 121, 122, 123, 124 can be used to measure voltages which are induced in the phases and to feed the measured voltages back to the control device 109. Said reference potential 103 can be for example a ground potential, GND or a ground terminal 103. In parallel with the high and/or low switches, i.e. in parallel with the bridge branches 125, 126, 127, 128, 129 or the half bridges 125, 126, 127, 128, 129, a capacitor 106 is arranged. Said capacitor is used to smooth the PWM signals generated by the bridge branches 125, 126, 127, 128, 129.

The five phase terminals 111, 112, 113, 114, 115 are connected to five sampling terminals 120, 121, 122, 123, 124, five sampling connections 120, 121, 122, 123, 124 or five measuring terminals 120, 121, 122, 123, 124. These lead to an evaluation device 107. The evaluation device 107 is connected to a control unit 109 or control device 109 via a connection line 108 or feedback line 108. The control device 109 is connected to the high switches 104', 104'', 104''', 104'''', 104''''' and low switches 105', 105'', 105''', 105'''', 105''''' via the switching terminals 110. Each of the switches has its own physical connection 110 to the control device. The control line 110 can alternatively be in the form of a bus so that each switch has a logical connection to the control device 109. The control device 109 is connected to the switches 104', 104'', 104''', 104'''', 104''''', 105', 105'', 105''', 105'''', 105''''' to actuate or drive the bridge branches. The combination of high switches 104', 104'', 104''', 104'''', 104''''' and low switches 105', 105'', 105''', 105'''', 105''''' form five bridge branches 125, 126, 127, 128, 129. Each of the bridge branches is thus connected to one of the phase terminals 111, 112, 113. The switches 104', 104'', 104''', 105', 105'', 105''' can be implemented by means of transistors or electronic switches.

The control device 109 or the processor 109 is adapted in such a way that both the high switch of each of the bridge branches and the low switch of each of the bridge branches can be actuated in a predeterminable sequence, the actuation taking place in such a way that one of the phase terminals is switched to passive. A phase terminal 111 switched to passive means that said phase terminal 111 is separated from the supply terminals in each case by means of the high switch 104' and the low switch 105', that is to say is separated from the terminals of the supply voltage 102 and the reference potential 103.

In the example in FIG. 1, the first phase terminal 111 which belongs to a phase coil a of the phase 141 of the motor 140 is switched to passive. The phase terminal switched to passive is shown by a dashed line in FIG. 1. By switching off the switches 104' and 105', the sampling input 121, which belongs to the phase 111, 141 switched to passive, can be used to measure a voltage induced in the phase coil a. In particular, by using phase a, switched to passive, the self-induction of the parallel connection of two active phase coils is measured between the branch point Y and the reference potential 103. This fact about the phase coil a, switched to passive, is represented in Table 1 by an O. Phase coils switched to active are denoted by L or H depending on the switching state thereof. H means that the corresponding phase coil, phase and/or the phase terminal is connected to the supply voltage terminal 102 via the corresponding high switch 104', 104'', 104''', 104'''', 104''''' and is thus also connected to the supply voltage $U_B$. L means that the corresponding phase coil, phase and/or the phase terminal is connected to the reference potential terminal 103 via the corresponding low switch 105', 105'', 105''', 105'''', 105''''' and is thus also connected to the reference potential.

TABLE 1

|   | T1 | | | |
|---|----|----|----|----|
|   | S1 | S2 | S3 | S4 |
| a | O | O | O | O |
| b | H | L | L | H |
| c | H | H | L | L |
| d | L | H | H | L |
| e | L | L | H | H |

Alternately, by using the control device 109, in each case one of the phases 141, 142, 143, 144, 145 and/or one of the phase coils a, b, c, d, e can be switched to passive. The phases are switched to passive according to the angle of rotation. The pre-set angle for the commutation angle in this case means that the angles are each 360°/10, i.e. 36°, up to the next step. In the case of five phases, a ten-step commutation is carried out. In the case of a three-phase machine with six-step commutation, the spacing of the commutation angles is 60°=360°/6. The switches 104'', 104''', 104'''', 104''''', 105'', 105''', 105'''', 105''''', which belong to the active coils, are actuated periodically by using the control device 109 to generate an alternating signal, in particular a PWM (pulse-width-modulated) signal. The switch is operated in such a way that, within an active bridge branch, the high switch and the low switch are switched in opposite directions so that, within an active bridge branch, always just precisely one of the two switches is connected and produces a new connection. Only in the case where a phase terminal 111, 112, 113, 114, 115 is switched to passive are both the corresponding high switch and the corresponding low switch switched off, open and not involved.

The motor 140, M is used in a ten-step commutation mode. The four active motor phase terminals 112, 113, 114, 115 and the corresponding active phase coils b, c, d, e are used to generate a voltage vector. Induced voltages result from the change in current effected by the PWM and the self-inductance of the coils involved. The induced voltages are measured when at least two active phases are connected to $U_B$, i.e. when at least two phases are switched to the high state (H), and the two other phases are connected to GND, thus are in the low state (L).

Instead of one passive phase and four active phases, it is also possible to use only two of the four active phases to determine the angle. However, then the full efficiency of the motor would not be achieved, since only part of the motor is used, namely two active and three passive phases, and since the signals in the three passive phases are substantially the same. In one example, however, minimal differences in the three passive phases can be detected by means of precise measurement technology, and the detected differences can be used for further motor characterisation and to describe the magnetic coupling.

By setting the switches in the respective states, parallel connections of the connected phases are produced. A voltage divider is formed, the centre of which is the star point Y or branch point Y.

When considering for example the state S1 from Table 1, the high switches 104'', 104''' are in the state H and the low switches 105'''', 105''''' are in the state L. Therefore, the coils b, c are coils which are switched to H, and the coils e, d are coils which are switched to L. The coils b, c and e, d are connected in parallel and form a voltage divider for the supply voltage $U_B$. In the example, this means that in the state S1, the coils b, c are connected in parallel, and the coils d, e. By varying the states, on the premise that two switches must be actuated from state to state, four states can be passed through S1, S2, S3, S4. The states are selected in this case in such a way that the switching states of precisely two coils always change from state to state so that always half of the number of the active phase coils are connected to H, and the other half are connected to L. By means of this switching, reversing of polarity of the voltage divider can be achieved.

A method which uses the principle of measuring inductance variance by means of ΔU is referred to in the context of this text as a DDIS process. In accordance with the direct delta inductance sensing process (DDIS), it is assumed that the angle of the rotor relative to the stator influences the inductances of the rotor coils a, b, c, d, e and/or of the phases a, b, c, d, e. Depending on the embodiment of the motor, the cause of this effect is a change in reluctance due to the rotor-angle-dependent geometry of the magnetic circuit from the point of view of the respective motor phases or appearance of saturation in the magnetic material or both. The inductance of the coils a, b, c, d, e is produced according to the formula:

$$L_i(\varphi) = L_P + L_S \cos\left[2\varphi + \frac{2\pi}{m}(i-1)\right];$$

where the phase number m=5 and
i=1, 2, 3, 4, 5 corresponding to the phase windings a, b, c, d, e.
In this case, $$L_P = \frac{L_Q + L_D}{2}$$

is the component of the phase inductance which is independent of the rotor position and $$L_S = L_Q - L_D$$

is the component of the phase inductance which is dependent on the rotor position.

In the case where $L_S \neq 0$, that is to say differs from the value 0, the voltage at the Y point or at the passive inverter output 111, 112, 113, 114, 115 or the passive phase terminal 111, 112, 113, 114, 115 will differ from $U_B/2$, while the motor is in for example one of the states S1-S4. In the PWM mode, there are four alternating switching states S1, S2, S3, S4. These four switching states S1, S2, S3, S4 occur in each commutation cycle $T_1, T_2, T_3, T_4, T_5$, in particular in each of the commutation cycles $T_1$-$T_{10}$, at least one or more times. A commutation cycle $T_1, T_2, T_3, T_4, T_5$ in this case denotes the duration for which the at least one phase is switched to passive. The states $T_6, T_7, T_8, T_9, T_{10}$ substantially correspond to the states $T_1, T_2, T_3, T_4, T_5$ but have a different polarity and/or correspond to a half turn.

Whereas in the case of three phases, it is determined which terminals are connected to the supply voltage and which are connected to the reference potential to form a voltage divider, a plurality of combinations can occur in the case of five phases. It would be possible for only one of the four active phases to be connected to the supply potential and the three others to be connected to the reference potential.

In addition to commutation intervals which occur when carrying out a commutation process, the commutation cycles $T_1, T_2, T_3, T_4, T_5$ can also be intervals during a start interval and/or detection interval. In this case, a start interval denotes an interval in which substantially no torque is generated in the rotor. An operating interval or commutation interval denotes an interval during an operating phase of the rotor in which a torque is generated, but said torque is briefly interrupted by a DDIS phase having a duty cycle of 50%. It is thus also possible to use an induction interval which substantially incorporates, inserts or induces a start interval in an operating interval. A torque is generated if a duty cycle of d is selected between the individual states which is substantially not equal to 50%. A torque is avoided if a duty cycle of d is selected between the individual states which is substantially equal to 50%.

Instead of a duty cycle which is substantially used to describe the state of a half bridge or of two half bridges operated in opposing directions, in the polyphase case, by setting a state, a voltage vector may be generated in the coordinate system 202 with the axes a 202' and b 202". Said voltage vector can be represented by five duty cycles a,b,c,d,e of the coordinate system 201.

To achieve a direct delta inductance sensing (DDIS) cycle, voltage differentials are formed from at least two measurements of reversely switched voltage dividers of the coils b, c, d, e connected in parallel. In a first state S1, by means of low switches 105"", 105""', the parallel connection of two active phases e, d is formed between the passive phase a, 141 or the branch point Y and the reference potential. In the state S1, a parallel connection of the two active phase coils d, e is correspondingly formed between the supply terminal 102 and the passive phase a, 141 or the branch point Y. In another state S3, which belongs to the voltage divider from the state S1, by means of low switches 105", 105"', the parallel connection of the corresponding remaining active phases b, c is formed between the passive phase a or the branch point Y and the reference potential. In the state S3, a parallel connection of the phase coils d, e is formed between the supply terminal 102 and the passive phase 141 or the branch point Y. In other words, the switches 104', 104", 104"', 104"", 104""', 105', 105", 105"', 105"", 105""' are actuated in such a way that all the active phase coils are involved in forming a voltage divider between the high terminal 102 and the low terminal 103. The voltage divider has a passive phase, wherein the number of phase coils a, b, c, d which, in a switching state S1, S3, are connected between the high terminal 102 and the passive phase or the branch point Y, are equal to the number of phase coils a, b, c, d which are connected between the low connection 103 and the passive phase or the branch point Y. Correspondingly, the switching states S2, S4 may be formed from combinations of the coil pair c, d and the coil pair b, e.

The phase coils a, b, c, d, e and/or phase terminals 111, 112, 113, 114, 115 which, in one switching state, are connected between the branch point Y and the low terminal 103, may be referred to as switched to low. The phase coils a, b, c, d, e and/or phase terminals 111, 112, 113, 114, 115 which, in one switching state, are connected between the branch point Y and the high terminal 102, may be referred to as switched to high. In each switching state, an inductance relation between the phase coils a, b, c, d, e is measured in the form of a voltage, depending on which phase is currently passive.

When applying an alternating voltage, a change in current results from the parallel connection of the low coils b, c, and/or when generating a PWM, a total inductance results from the self-inductances of the phase coils involved in the parallel circuit. For example, in the example in the state S1 from Table 1, the total inductance $L_{H1}$ of the inductances directly connected to the high terminal resulting in the switching state S1 for the parallel circuit of the high coils b, c is:

$$L_{H1} = \frac{L_b L_c}{L_b + L_c} = \frac{L_2 L_3}{L_2 + L_3}$$

The total inductance $L_{L1}$ switched to low resulting for the parallel connection of the low coils d, e in the switching state S1 is:

$$L_{L1} = \frac{L_d L_e}{L_d + L_e} = \frac{L_4 L_5}{L_4 + L_5}$$

In a similar manner, in the state S2, for the parallel connection of the high coils c, d, the total inductance $L_{H2}$ switched to high of the inductances directly connected to the high terminal is produced:

$$L_{H2} = \frac{L_c L_d}{L_c + L_d} = \frac{L_3 L_4}{L_3 + L_4}$$

The total inductance $L_{L2}$ switched to low resulting for the parallel connection of the low coils b, e in the switching state S2 is:

$$L_{L2} = \frac{L_b L_e}{L_b + L_b} = \frac{L_2 L_5}{L_2 + L_5}$$

$L_{H1}$ is the total inductance of the parallel connection switched to low in the state S3. $L_{H2}$ is the total inductance of the parallel connection switched to low in the state S4. In each of the states S1, S2, S3, S4, in the phase switched to passive, an induced voltage or a voltage $U_1$, $U_2$, $U_3$ and $U_4$ caused by the self-induction of the parallel connection switched to low can be determined.

The differences in voltage between $U_1$ and $U_3$ is $\Delta U_1$ or $\Delta U_{1a}$, $\Delta U_{1b}$, $\Delta U_{1c}$, $\Delta U_{1d}$, $\Delta U_{1e}$ and/or is $\Delta U_{2a}$, $\Delta U_{2b}$, $\Delta U_{2c}$, $\Delta U_{2d}$, $\Delta U_{2e}$ depending on the passive phase a, b, c, d, e in which or the corresponding measurement input 120, 121, 122, 123, 124 at which measurement has been carried out. $\Delta U_1$ is calculated following the formula $$U_1 = \frac{L_{L1}}{L_{H1} + L_{L1}} U_B$$

$$U_3 = \frac{L_{H1}}{L_{H1} + L_{L1}} U_B$$

$$\Delta U_1 = U_1 - U_3 = \frac{L_{L1} - L_{H1}}{L_{H1} + L_{L1}} U_B$$

$\Delta U_2$ is calculated following the formula $$U_2 = \frac{L_{L2}}{L_{H2} + L_{L2}} U_B$$

$$U_4 = \frac{L_{H2}}{L_{H2} + L_{L2}} U_B$$

$$\Delta U_2 = U_2 - U_4 = \frac{L_{L2} - L_{H2}}{L_{H2} + L_{L2}} U_B$$

In this case, Table 1 shows the commutation duration T1=S1+S2+S3+S4 during a measurement cycle, for example without torque. In operation intermediate states may occur in addition to states S1, S2, S3, S4 to generate the required torque. During the duration T1, the phase a is switched to passive, which is shown by an O, and the phases b, c are switched to high in the switching state S1, and the phases d, e are switched to low, i.e. are connected to the high terminal and/or low terminal. In the subsequent switching state S2, the phase b and e is switched to low, and/or the phase c, d is switched to high. In the subsequent switching state S3, which belongs to S1, the phase b and c is switched to low, and/or the phase d, e is switched to high. In the subsequent switching state S4, which belongs to S2, the phase c and d is switched to low, and/or the phase b, e is switched to high. These switching phases last and are executed alternately until switching over to a new constellation at the commutation point in time at the boundary of T1 to T2 for the duration T2, in which constellation the phase b is switched to passive, and combinations of the phases a, c, d, e are switched through. After a third commutation point in time at the boundary between T2 and T3, during the duration T3, the phase c, 113 is switched to passive and switched back and forth between the phases a, b, d, e. Thus, at the boundary between T3 and T4, during the duration T4, the phase d, 114 is switched to passive, and at the boundary between T4 and T5, for the duration T5, the phase e, 115 is switched to passive. The process then repeats periodically starting with S1.

In order to be able to influence the start-up of a motor M, 140 at standstill, the actuation of a motor M, 140 rotating at a low speed, or the braking of a motor M, 140, the current position of the motor M or a motor parameter is determined by an actuation sequence of the active switches 104″, 104‴, 104⁗, 104‷, 105″, 105‴, 105⁗, 105‷, impressing a torque being substantially dispensed with by selecting the duty cycle and/or voltage vector. It is thus possible for example, when the supply voltage $U_B$ is applied between the supply terminals 102, 103, to control the switches 104″, 104‴, 104⁗, 104‷, 105″, 105‴, 105⁗, 105‷ of the active bridge branches 126, 127, 128, 129 by means of the control unit 109 in such a way that, during a first period $T_1$ the first phase terminal 111, a is switched to passive. During this period T1, the parallel connection of the second 112, b and third 113, c phase terminals and the parallel connection of the fourth 114, d and fifth 115, d phase terminals are set. This is connected alternately by the parallel connection of the third 113, c and fourth phase terminals 114, d and the parallel connection of the second 112, b and fifth 115, e phase terminals in a predeterminable duty cycle to the high terminal 102 and the low terminal 103, reversing the polarity of the formed voltage dividers also occurring between the connection.

In other words, this may mean that, whilst one of the terminals 111, 112, 113, 114, 115 is switched to passive, a voltage is induced in said terminal. In addition, the phases 141, 142, 143, 144, 145 are arranged in such a way that there is substantially no magnetic and/or transformer coupling between the motor phases, or said coupling is not relevant. This may mean that a change in current in a motor phase 141, 142, 143, 144, 145 does not lead to a change in voltage in another motor phase via magnetic coupling. Only the position of the rotor relative to the stator substantially influences the magnetic flux through the phase windings and thus the impedance of the phases, which can be measured by means of the voltage differential.

A rotating motor can effect two types of induction. An EMF and a change in impedance, in particular a change in the inductance and/or inductivity. The change in voltage as a result of EMF or as a result of a transformer-based effect, that is to say mutually penetrating of the coils by magnetic fields, is substantially avoided by magnetic insulation. Whereas these effects are substantially avoided, the change in the self-inductance is determined and evaluated by measuring the voltage differential $\Delta U_1$ and/or $\Delta U_2$. Since the voltage (EMF), which is brought about by the movement of the rotor, is substantially avoided or eliminated, the voltage which is effected by a change in impedance or induction is evaluated. In order to measure the latter voltage, the bridge branches 126, 127, 128, 129 switched to active are excited alternately by means of a PWM process in order to bring about a change in current. This alternating excitation is achieved in that the corresponding active phase terminals 112, 113, 114, 115 are alternately connected to the high terminal 102 and the low terminal 103, to which a DC voltage is connected. By alternately switching the switches on and off, the DC voltage is chopped, and in the passive phase, a voltage is induced or impressed which allows a statement about the relative position of the rotor to the stator.

The period $T_1$, during which the first phase terminal 111 is switched to passive and the four other phase terminals are switched to active corresponds to a commutation period. The commutation period is the time $T_1$ until pole windings a, b, c, d, e have to be switched to maintain a rotational movement. These times substantially correspond to angles which are each 36°. In the case of seven phases, the angles are 360°/7 or 360°/14. In the case of eleven phases, the angles are 360°/11 or 360°/22. After passing through the angle assigned to the period T1, the second phase terminal 112 takes on the role of the passive phase terminal for a time $T_2$, then for the period $T_3$, the third phase terminal 113, then for the period $T_4$ the fourth phase terminal 114, and then for the period $T_5$, the fifth phase terminal 115. The sum of the periods $T_1$, $T_2$, $T_3$, $T_4$ and $T_5$ corresponds to the time for a half turn of an electric motor belonging to the motor M, 140.

During the periods $T_1$, $T_2$, $T_3$, $T_4$ and $T_5$, which take place between the switching of the passive phase terminals, the phases which are each switched to active are operated alternately. During this alternating active operation, in the case of a five-phase motor, firstly two of the high switches 104", 104"', 104"", 104""' are closed and connect the corresponding phase terminals 112, 113, 114, 115 to the high terminal 102. The low switches 105", 105"', 105"", 105""' of the bridge branches, which low switches belong to the closed high switches, behave in the exact opposite manner to the high switches of these bridge branches and are open. Thus, a voltage divider comprising coils connected in parallel is produced. The duration for which the first and second active high switches are closed is S1, the duration for which the second and third active high switches are closed is S2, the duration for which the third and fourth active high switches are closed is S3, the duration for which the fourth and first active high switches are closed is S4. Thereafter, the process repeats periodically during the corresponding periods $T_1$, $T_2$, $T_3$, $T_4$, $T_5$.

The duration of a PWM period is S1+S2+S3+S4+SX. In this case, SX describes any other states or intermediate states. This applies in particular to the special case where S1 and S2 are of the same length. In the other cases, the voltage vector is selected in such a way that no torque is generated in the corresponding measurement cycle. The duty cycle is set by means of a voltage vector in the coordinate system 202, but ambiguities can result for S1-S4-SX, i.e. for S1 to S4 and for S4 to SX. The voltage vector is standardised. In addition to the five-phase arrangement, this also applies for seven and eleven phases.

Regardless of how the duty cycle is set, when selecting a duty cycle of d=50%, in the passive phase and the corresponding passive phase terminal, a voltage is induced, but no torque is generated. Therefore, selecting a duty cycle of 50% can be used to determine a motor parameter without influencing the rotational movement of the motor. During S1, the voltage $U_1$ can be determined in the passive phase terminal, during S2, the voltage $U_2$ can be determined in the passive phase terminal, during S3, the voltage $U_3$ can be determined in the passive phase terminal, and during S4, the voltage $U_4$ can be determined in the passive phase terminal. By means of these values, the two voltage differentials $\Delta U_1$ and $\Delta U_2$ are determined.

From the two voltage differentials $\Delta U_1$ and $\Delta U_2$, an angle can be determined already during the time period T1, in which angle currently a rotor is arranged relative to a stator of the motor M.

Figure 2:
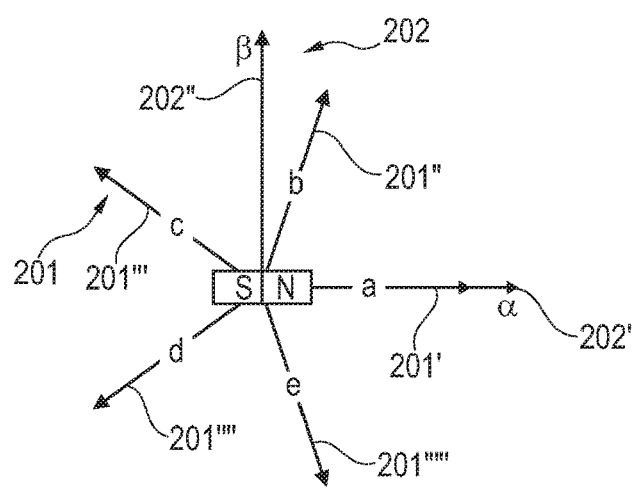
FIG. 2 shows a rotor coordinate system in relation to a stator coordinate system of an electric motor according to an exemplary embodiment of the present invention.

In order to illustrate the principle of determining angular position, FIG. 2 shows for example the rotor coordinate system 201 in relation to a stator coordinate system 202 according to an exemplary embodiment of the present invention. The rotor coordinate system 201 moves together with a rotor of the motor M in relation to the stator coordinate system 202. The abscissa $\alpha$, 202' and the ordinate $\beta$, 202" are arranged perpendicular relative to one another and are based on a stator of the motor M and are thus stationary. The stator coordinate system 202 can be used to represent a generated total voltage vector having two coordinates a, b, the total voltage vector having been generated by setting the vector components a, b, c, d, e in the coordinate system 201. The coordinate system 201 shows five vectors a, 201', b, 201", c, 201"', d, 201"" and e, 201""'. The vectors correspond to the orientation of magnetic fields and/or the voltage components which are generated by the phase windings a, 141, b, 142, c, 143, d, 144 and e, 145 of the motor M. The vectors 201', 201', 201"', 201"", 201""' thus correspond to a three-dimensional arrangement of the phase windings a, b, c, d, e. The phase windings a, b, c, d, e and the corresponding vectors of the magnetic fields thereof are oriented at an angle of 72° relative to one another.

Figure 7:
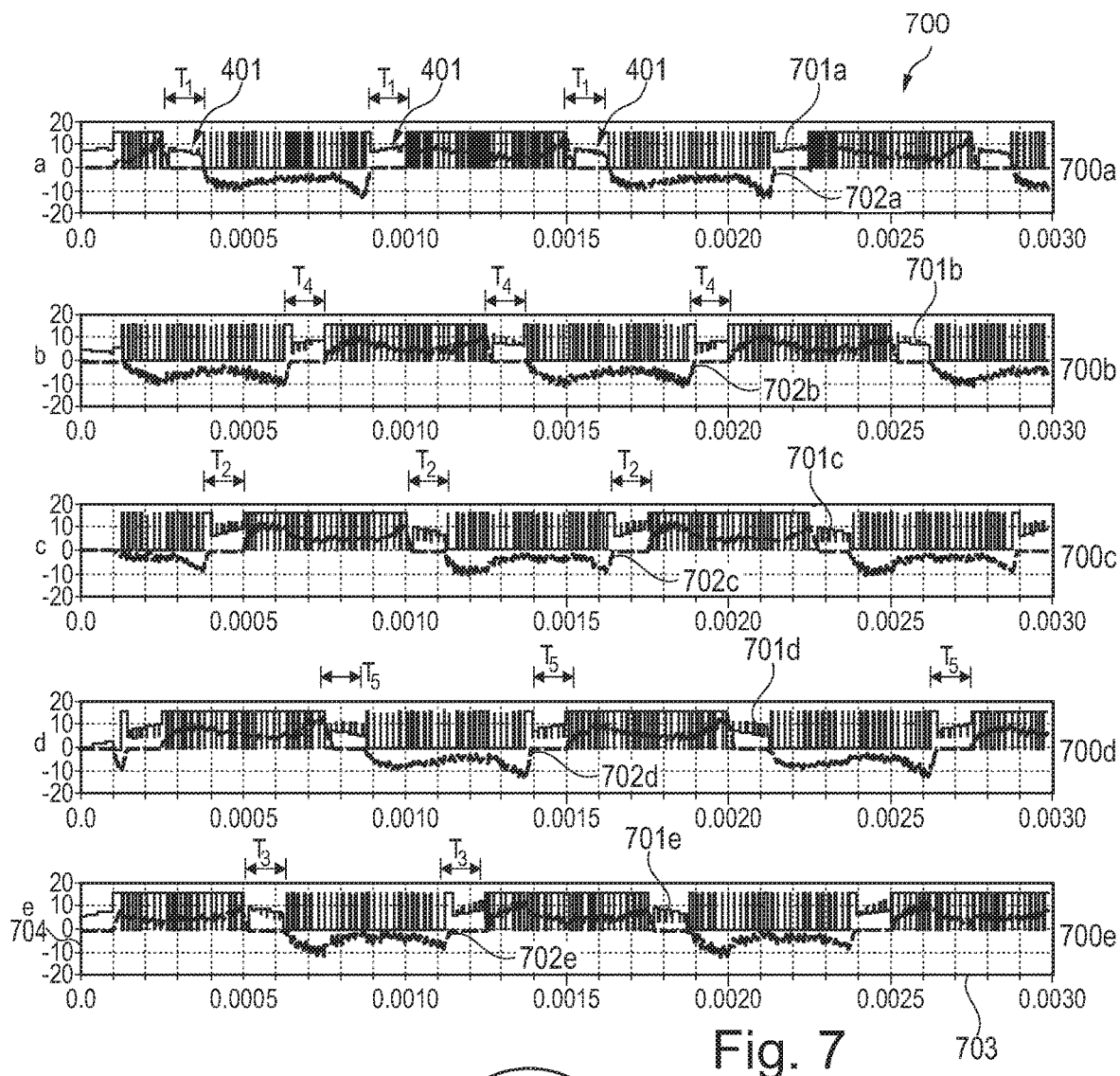
FIG. 7 shows the sequence of the ten-step commutation according to an exemplary embodiment of the present invention.

In one example, only the states S1 and S3 can be passed through alternately in a commutation cycle 401, $T_1$, $T_2$, $T_3$, $T_4$, $T_5$ according to FIG. 7. Although in FIG. 7, only the two states S1 and S3 are passed through, FIG. 7 can also be used to illustrate an example in which all the states S1 to S4 are passed through in each commutation cycle $T_1$, $T_2$, $T_3$, $T_4$, $T_5$.

In other words, a voltage vector is to be set with a specific direction and amplitude. When setting the voltage vector, intermediate states can also occur. A voltage vector is described, with the components $\alpha$ and $\beta$, according to FIG. 2 in the two-dimensional coordinate system 202 for a simple illustration. However, the voltage vector is composed of components a, b, c, d, e of the coordinate system 201.

Due to the fact that a motor M, having five phases a, b, c, d, e, has corresponding coils, each coil is electrically commutated after a half turn. A ten-stage commutation operation having ten commutations thus results for the five-phase motor M. The respective four active motor phases, i.e. the phases a, b, c, d, e, which are connected to the active bridge branches 125, 126, 127, 128, 129, are operated by using bipolar PWM (pulse width modulation). Due to the connection of the five phases 141, 142, 143, 144, 145 to the Y point or star point, when the bridge switches are accordingly operated against one another, four phases 141, 142, 143, 144, 145 or phase windings a, b, c, d, e are always active whilst one of the phases is switched to passive. During a first switching state S1, two high switches of two active bridge branches and two low switches of the other active bridge branches are switched on. During the first switching state S1, an electric circuit can be formed from the high terminal 102, via the two switched-on high switches 104", 104''', the phase terminals 112, 113 of the motor phases b, c, the Y branch point, the phase terminals 114, 115 of the motor phases d, e, via the low switches 105"", 105"''' to the low terminal 103. In the case of substantially the same type of construction of the four active phase coils b, c, d, e, for example b, c, d and e, an inductive voltage divider is formed, in which in each case two high phases b, c and two low phases d, e are connected in parallel. The Y branch point has a potential of $U_B/2$ in the case, as assumed in FIG. 1, that the inductances and/or impedances of the coils of the phases are balanced.

The motor control system 130 is formed by the actuating apparatus 100 or MCU (motor control unit) 100 together with the control device 109, the microcontroller 109 or the processor 109 and the sampling device 107 or measuring device 107 together with the motor M, 140.

Figure 3:
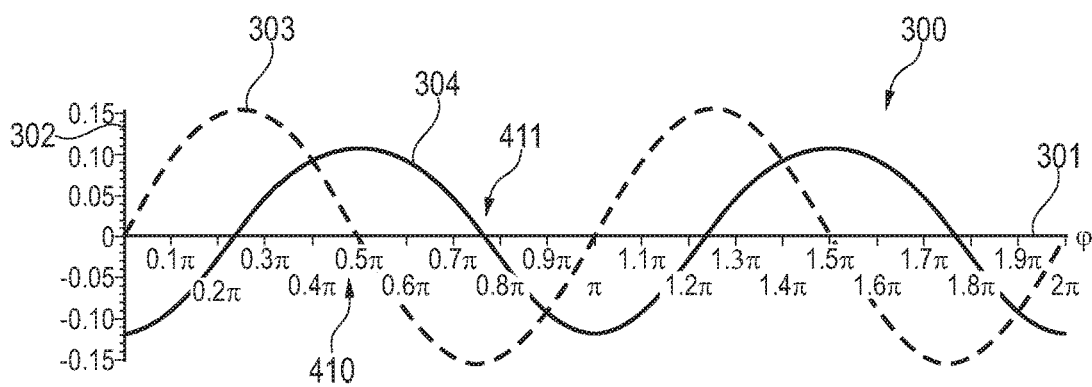
FIG. 3 shows the progression of two voltage differentials in a passive phase terminal during rotation of the rotor according to an exemplary embodiment of the present invention.

FIG. 3 shows the progression of two voltage differentials in a passive phase terminal as a function of the rotor angle, for example during forced or manual rotation of the rotor, according to an exemplary embodiment of the present invention. FIG. 3 shows a progression of two voltage differentials $\Delta U_1$ and $\Delta U_1$ based on the supply voltage $U_B$ ($\Delta U1/U_B$, $\Delta U2/U_B$) measured in the phase a, 141 switched to passive and/or in the star point Y according to an exemplary embodiment of the present invention. FIG. 3 is a graph 300 showing the two curves 303, 304 of the ratios of the voltage differentials based on the supply voltage. The progression of the differential voltage $\Delta U_1$ is shown as the standardised ratio $\Delta U1/U_B$ in the curve 303. The progression of the differential voltage $\Delta U_2$ is shown as the standardised ratio $\Delta U2/U_B$ in the curve 304.

The curves 303, 304 were produced in that the switching patterns S1, S2, S3, S4 were applied periodically to a five-phase motor with a duty cycle of d=50% so that no torque was impressed in the motor by the current. In particular, a voltage vector may be generated in such a way that no torque is impressed, and the motor does not rotate as a result of applying a switching pattern. However, the motor was mechanically rotated to obtain measurement values for all angle values of a mechanical rotation. In this case, an external force was impressed, that is to say a torque was impressed mechanically. The active phases are switched alternately in the rhythm S1, S2, S3 and S4 while the rotor was rotated mechanically. The mechanical rotation is necessary because the duty cycle 50% is selected, and thus no torque is impressed by the active phases. The angle values φ of the rotor from 0 to $2\pi$ are shown on the abscissa 301. The ratios of the voltage differentials $\Delta U/U_B$ are entered on the ordinate 302 in the range from −0.15 to +0.15. The progressions of the voltage differentials 303, 304 give an unambiguous pattern by means of which an angle can be unambiguously deduced. The voltage differential curves 303, 304 can be recorded in a memory. However, they can also be determined numerically or analytically by evaluating the formulae of the inductance of the coils a, b, c, d, e and the voltage differentials. In this case, the curves can be determined by carrying out a start-up or motor recognition sequence. A start-up sequence of this type may be designed in such a way that, despite passing through a sequence S1, S2, S3, S4, no torque is generated. For example, each of the five phases can be switched to passive one after the other, and the sequence S1, S2, S3, S4 can be passed through so that five interpolation points in each case can be determined on the curve $\Delta U1$ 303 and/or $\Delta U2$ 304. The interpolation points are each determined at a fixed angle, since the motor does not rotate due to the lack of torque. These interpolation points can then be assumed to each lie on a curve 303, 304 and the curve shapes 303, 304 can be constructed by numerical evaluation of the formulae for the inductance and the voltage differential.

After the four switching states S1, S2, S3 and S4 have been passed through, the voltages U1, U2, U3 and U4 are certain throughout the self-induction of the coils and the formation of the voltage divider. By applying connections according to Table 1, the voltages U1 and U3 belong to the same voltage divider which has the same parallel connections of phases and which is just operated with reversed polarity in the switching states S1, S3. The voltages U2 and U4 likewise belong to the same voltage divider which has the same parallel connections of phases and is just operated with reversed polarity in the switching states S2, S4. The structure of the voltage dividers, which are involved in forming $\Delta U_1$ and $\Delta U_2$, differs. By means of this configuration, the voltage differential $\Delta U_1$ and $\Delta U_2$ which is dependent on the angle of rotation can be determined according to the angle of rotation. The voltage differentials $\Delta U_1$ and $\Delta U_2$ may only be measured when the phases involved in forming the voltage dividers are actuated alternately, in order to generate an alternating current which produces a voltage according to the angle-dependent inductance, in particular the angle-dependent total inductance of the parallel connection.

From the determined curve, the rotary position of a rotor can be determined during operation and transferred to a commutation process. As a commutation condition, two $\Delta U$ values are determined which are used as a threshold to carry out a commutation when the thresholds are exceeded. These commutation conditions are determined while the motor is free from torque and monitored during the movement of the motor in order to be able to commutate at the right time. In order to determine the curves 303, 304 or in order to monitor the commutation condition, a lookup table of the curves 303, 304 can be recorded in the memory of the controller 109. In each commutation step, however, other $\Delta U$ can be relevant as a commutation condition, i.e. in each case 5 $\Delta U$ per half turn. After a half turn, the values repeat.

Motor parameters can also be determined by voltage differential curves. Said motor parameter can be transferred to the commutation process. In order to deduce the rotary position from the graph 300, during at least one pass through the sequence S1, S2, S3, S4, the current standardised ratio $\Delta U1/U_B$ and $\Delta U2/U_B$ is detected, and the angle belonging to the two values is read on the abscissa 301. In other words, a voltage pattern is detected in such a way that the currently measured values ratio $\Delta U1/U_B$ and $\Delta U2/U_B$ can be assigned to precisely one angle. This angle which can be assigned to both values indicates the current rotary position of the rotor. This determination can be carried out when at a standstill in a start interval or also during an operating interval. The minimum time for a determination is the sum of the durations for S1, S2, S3, S4, for example T1=S1+S2+S3+S4. For this purpose, however, the curves 303, 304 should already be present in the memory to avoid inaccuracies. In one example, T1 can be the commutation time and have a duration which corresponds to a multiple of the minimum duration of S1+S2+S3+S4. The values of the curves 303, 304 can be stored as curves or as tables to allow angle detection. The recognition of the voltage pattern and the determination of the corresponding angle can take place either visually, by visually comparing the curves, and/or numerically in that the measurement values are visually searched for on the curves and/or in that values are retrieved from the table. In order to increase the precision, average values can be formed from a plurality of measurements and/or additional passive phases can be incorporated. For example, the times T2, T3, T4, T5 can indicate periods during which the corresponding phase b, c, d, e is switched to passive.

The curves 303, 304 are sinus-like and are phase-shifted by approximately 90°. Due to the selected combination of phase coils to voltage dividers, the amplitude of the curve 303 is higher than the curve 304. This increased amplitude results from the application of the formulae for the inductance and the voltage differentials. In order to determine the curve 303, the voltage across the parallel connection of the phase coils d, e and b, c is evaluated alternately. In order to determine the curve 304, the voltage across the parallel connection of the phase coils b, e and c, d is evaluated alternately.

The motor M, 140 is operated in a ten-step commutation mode to create the curves 303, 304. The four active motor phases are operated to generate a voltage vector. By means of the coordinate systems 202 a, b, a composed voltage vector of the components b, c, d, e, 201″, 201‴, 201⁗, 201‴″ can be formed in T1. This voltage vector effects a current vector which in turn, depending on the rotor position, effects a momentum in a specific direction. The voltage is measured at least in switching states in which two phases are connected to the supply voltage, and the two other voltages are connected to the reference potential. This results in four states S1, S2, S3, S4 for the five-phase machine. At least one measurement of the states at two different points in time is used to pass through a DDIS cycle. Table 1 shows the switching states in which voltage measurements were carried out and in which the phase a is passive. The ratios $\Delta U1/U_B$ and $\Delta U2/U_B$ are measured at the branch point Y and/or at the phase a. The phase measurement can be carried out when the individual phases are magnetically insulated from one another so that no coupling of the magnetic fields of the coils to one another takes place.

The passive phase in which the curve shape from the graph 300 is produced can be used as an angle sensor (resolver) to determine the angle of rotation. The current through the active phases can be different in size. In the case of a three-phase motor, the current through the active phases is substantially always the same, since there are no further branching options for the current than through the two active phases connected in series. In the case of the five-phase motor, due to the parallel connection of at least two active phases to form a voltage divider branch, an asymmetrical current distribution can occur in the parallel connection. In the case of parallel connection of the phase branches, the current can be distributed asymmetrically on the phase branches. This current distribution can be brought about in a targeted manner by the selection of the voltage vector or can result from the voltage vector being currently applied.

Figure 4:
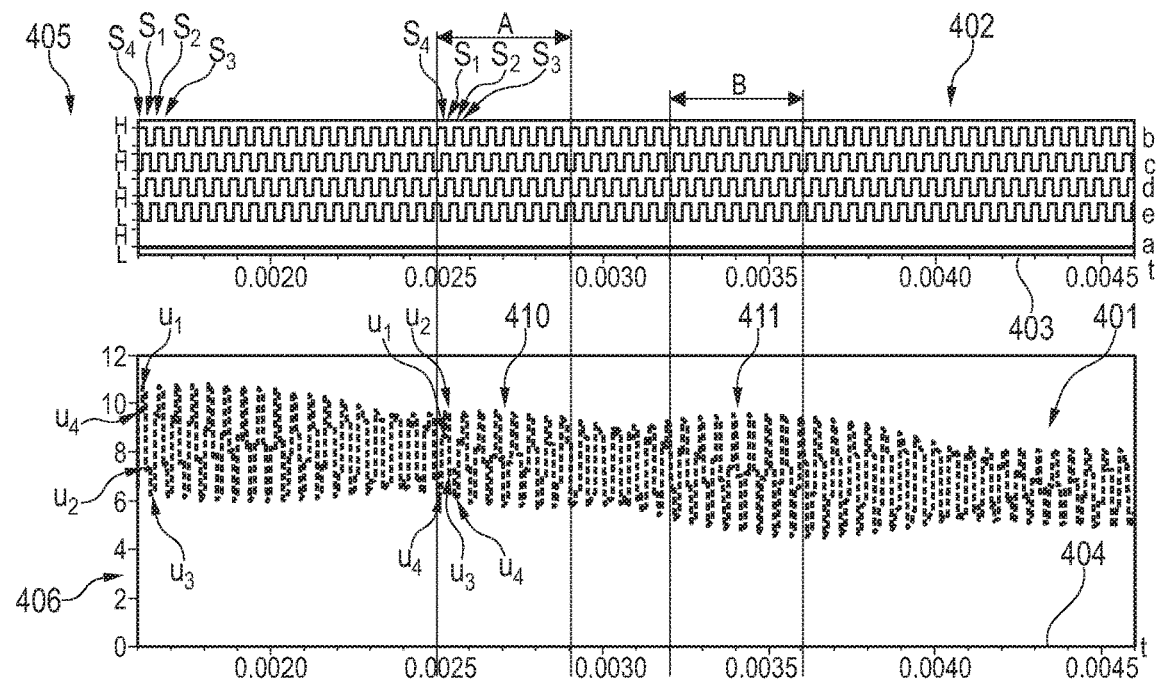
FIG. 4 shows the progression of an absolute voltage in a passive phase with corresponding switching states according to an exemplary embodiment of the present invention.

FIG. 4 shows the progression 401 of an absolute voltage in a passive phase a in a simulation with a corresponding circuit diagram 402 of the switching states according to one exemplary embodiment of the present invention. The switching states are marked out on the x-axis 403, 404 as a function of time t. The voltage values $U_{1,2,3,4}$ are marked out on the ordinate 406 and range from 0 to 12. In graph 402, the four switching diagrams of the active phases b, c, d, e and in particular the high switches and low switches thereof are shown in the form of phase-shifted rectangular curves. The rectangular curves switch back and forth between the state H and L and are mutually phase-shifted in such a way that the states S1, S2, S3, S4 are produced periodically. Each of the rectangular curves per se forms a PWM, in particular a bipolar PWM, and generates a change in current in the corresponding phase. The state H means that the corresponding phase is connected to the supply voltage $U_B$ by means of the high switch, and the state L means that the corresponding phase is connected to the reference potential by means of the low switch. On the ordinate 405, the switching states H, L by means of which the switches of the actuating apparatus 100 can be controlled are indicated.

From FIG. 4, it can be seen that graph 402 starts with the state S4, in which the phase b receives the control pulse H, the phase c receives the control pulse L, the phase d receives the control pulse L, and the phase e receives the control pulse H. The state S1 follows, in which the phase b receives the control pulse H, the phase c receives the control pulse H, the phase d receives the control pulse L, and the phase e receives the control pulse L. The switching states S1, S2 and S3 follow. It is to be seen that an active phase is kept constant on average over two clock states. After passing through the states S4, S1, S2, S3, the sequence repeats periodically in the order S4, S1, S2, S3. Whilst the control pulses 402 are generated periodically by the control device 109, the rotor is mechanically rotated in a uniform manner. The rotation is mechanically forced. The duty cycle of the control sequence 402 is selected in such a way that no torque is generated by the supplied electrical power, as a result of which the mechanical rotation is necessary for movement.

In the curve 401, the voltage progression is shown which results when applying the actuation pattern according the control curves 402 in the phase a switched to passive. The applied control sequence 402 is configured in such a way that a modulated voltage vector which is zero results. If a voltage vector not equal to zero is applied with a corresponding PWM pattern, there are more switching states than S1, S2, S3, S4, and even intermediate states can occur. In the case of an intermediate state, for example when effecting a switching pattern, a state can accrue in which for example three phase connections of the four active phase terminals are switched to H and only one is switched to L, or in which three phase terminals are switched to L and only one is switched to H.

In the time range from 0.0025 s to 0.0029 s on the time axis 404, a region A is indicated. This leads to the sub-segment 410 of the voltage progression 401 in the graph 401. In this region, the voltages U1 and U3 effected by the switching states S1 and S3 are approximately the same. Thus, in the region 410, the voltage differential curve $\Delta U1/U_B$, 303 is equal to zero and has a zero-crossing. This zero-crossing 410 is also marked in the curve 303 in FIG. 3 and is dependent on the angle of rotation.

In the time range from 0.0032 to 0.0036 on the time axis 404, a region B is indicated. The region B is phase-shifted by 90° relative to the region A. This region B leads to the sub-segment 411 of the voltage progression 401 in the graph 401. In this region B, the voltages U2 and U4 effected by the switching states S2 and S4 are approximately the same. Thus, in the region 411, the voltage differential curve $\Delta U2/U_B$, 304 is equal to zero and has a zero-crossing. This zero-crossing 411 is also marked in the curve 304 in FIG. 3 and is phase shifted by about 90°. By means of the phase shift, the voltage patterns which are to be found in order to determine the angles, are separated very clearly from one another as a result of which the angles of rotation by means of this phase shift can be well recognised. The 90° phase shift results from the actuation, as can be seen for example from FIG. 2. Thus, for example in state S1 phases b and c are on and a vector parallel to axis β results. The ability of well recognising the angles with the selected curves 303, 304 exists primarily due to the fact that two curves are available and there is always a curve with a sharp increase per angle, as in the case of a resolver.

Figure 5:
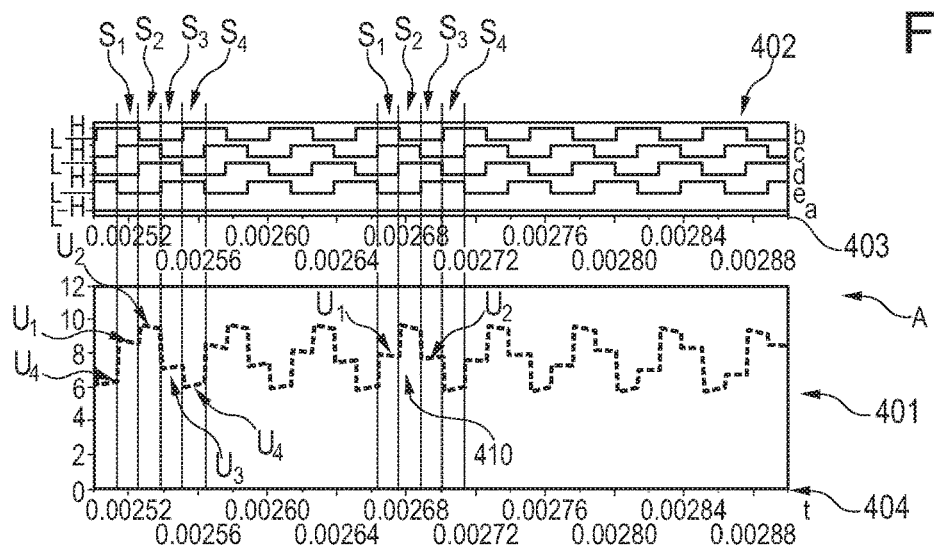
FIG. 5 shows a detail from FIG. 4 according to an exemplary embodiment of the present invention.

FIG. 5 shows section A from FIG. 4 in proximity to the zero-crossing of the voltage differential curve $\Delta U1/U_B$, 303 according to one embodiment of the present invention. In this enlarged view, the switching states S1, S2, S3, S4 and the resulting voltages $U_1$, $U_2$, $U_3$, $U_4$ can be seen. In the region of the zero-crossing 410, $U_1$ and $U_3$ are approximately equal, and therefore a voltage differential $\Delta U1/U_B=0$ is produced.

Figure 6:
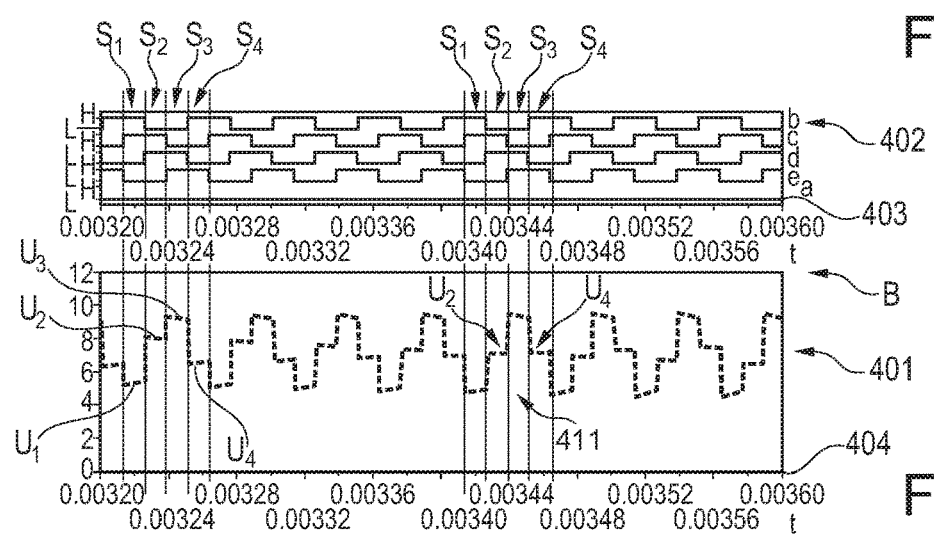
FIG. 6 shows a detail from FIG. 4 in which the rotor is rotated 90° further relative to FIG. 5 according to an exemplary embodiment of the present invention.

FIG. 6 shows a section from FIG. 4, which is phase shifted by 90° relative to FIG. 5 according to an exemplary embodiment of the present invention. In particular FIG. 6 shows a section from FIG. 4 in which the rotor is rotated further by 90° relative to FIG. 5. FIG. 6 shows the section B from FIG. 4 in proximity of the zero-crossing of the voltage differential curve $\Delta U2/U_B$, 304. In this enlarged view, the periodically repeating switching states S1, S2, S3, S4 and the resulting voltages $U_1$, $U_2$, $U_3$, $U_4$ can be seen. In the region of the zero-crossing 411, $U_2$ and $U_4$ are approximately equal, and therefore a voltage differential $\Delta U2/U_B=0$ is produced.

FIG. 7 shows the sequence of various switching states according to an exemplary embodiment of the present invention. One timing chart 700a, 700b, 700c, 700d, 700e is indicated per phase a, b, c, d, e. The abscissa 703 of each of the charts indicates the time range which ranges from 0.0000 s to 0.0030 s. Although in FIG. 7, only the two states S1 and S3 are passed through, FIG. 7 can also be used to illustrate an example in which all the states S1 to S4 are passed through in each commutation cycle $T_1$, $T_2$, $T_3$, $T_4$, $T_5$.

In chart 700a, the actuation of the phase a is shown. It can be seen that the voltage progression 701a regularly alternates between H and L to generate a PWM. This PWM is interrupted by the commutation intervals T1. During these commutation intervals, the phase a is switched to passive. The passive switching can be recognised, since the current through this phase a, which current is indicated by the current curve 702a, decreases to the value zero during T1. During the time T1, the induced absolute voltage progression 401 can be measured in the passive phase a, from which progression the progressions of the voltage differential ratios $\Delta U1/U_B$ and $\Delta U2/U_B$ can be determined. At the end of the time interval T1, at the commutation boundary, the phase a is required to continue to drive the motor. The phase contributes to the current. The phase a is switched to active, and the interval T2 follows, as can be seen from the chart 700c.

To additionally determine the angle of rotation, the next phase coil is switched to passive, in the example of FIG. 7, the phase c. In chart 700c, it can be seen that the voltage progression 701c regularly alternates between H and L to generate a PWM. At the interval boundaries, phase shifting can occur during operation of the individual high switches or low switches relative to the preceding interval. To generate a torque, a vector is generated in that a suitable pattern is calculated. However, all the active phases are always used, for example by the pattern S1-S4. This PWM is interrupted by the commutation intervals T2. During these commutation intervals T2, the phase c is switched to passive. The passive switching can be recognized, since the current in the phase c, which current is indicated by the current curve 702c, decreases to the value zero during T2. During the time T2, the induced absolute voltage progression can be measured in the passive phase c, from which the progressions of the voltage differential ratios $\Delta U1/U_B$ and $\Delta U2/U_B$ can be determined. At the end of the time interval T2, at the commutation boundary, the phase c is required to continue to drive the motor. The phase c is switched to active, and the interval T3 follows, during which the phase e is switched to passive.

To additionally determine the angle of rotation, the next phase coil is switched to passive, in the example of FIG. 7, the phase e, is switched to passive. In chart 700b, it can be recognised that the voltage progression 701e regularly alternates between H and L to generate a PWM. This PWM is interrupted by the commutation intervals T3. During these commutation intervals T3, the phase e is switched to passive. The passive switching can be recognised, since the current in the phase e decreases to zero during T3, which current is indicated by the current curve 702e. During the time T3, the induced absolute voltage progression can be measured in the passive phase e, from which voltage progression the progressions of the voltage differential ratios $\Delta U1/U_B$ and $\Delta U2/U_B$ can be determined. At the end of the time interval T3, at the commutation boundary, the phase e is required to continue to drive the motor. The phase e is switched to active, and the interval T4 follows, during which the phase b is switched to passive.

To additionally determine the angle of rotation, the next phase coil is switched to passive, in the example of FIG. 7, the phase b, is switched to passive. In chart 700b, it can be recognised that the voltage progression 701b regularly alternates between H and L to generate a PWM. This PWM is interrupted by the commutation intervals T4. During these commutation intervals T4, the phase b is switched to passive. The passive switching can be recognised, since the current in the phase b decreases to the value zero during T4, which current is indicated by the current curve 702b. During the time T4, the induced absolute voltage progression can be measured in the passive phase b, from which voltage progression the progressions of the voltage differential ratios $\Delta U1/U_B$ and $\Delta U2/U_B$ can be determined. At the end of the time interval T4, at the commutation boundary, the phase b is required to continue to drive the motor. The phase b is switched to active, and the interval T5 follows, during which the phase d is switched to passive.

To additionally determine the angle of rotation, the next phase coil is switched to passive, in the example of FIG. 7, the phase d, is switched to passive. In chart 700d, it can be recognised that the voltage shape 701d regularly alternates between H and L to generate a PWM. This PWM is interrupted by the commutation intervals T5. During these commutation intervals T5, the phase d is switched to passive. The passive switching can be recognised, since the current in the phase d decreases to the value zero during T5, which current is indicated by the current curve 702*d*. During the time T5, the induced absolute voltage progression can be measured in the passive phase d, from which voltage progression the progressions of the voltage differential ratios $\Delta U1/U_B$ and $\Delta U2/U_B$ can be determined. At the end of the time interval T5, at the commutation boundary, the phase d is required to continue to drive the motor. The phase d is switched to active, and the interval T1 follows again, during which the phase a is switched to passive.

After passing through the sequence T1, T2, T3, T4, T5, an electric half turn is performed, i.e. an angle of rotation of 180° is covered. The full sequence repeats periodically. Only the periods T1, T2, T3, T4, T5 can be longer or shorter depending on the turning rate of the motor. They are therefore turning rate-dependent.

Figure 8:
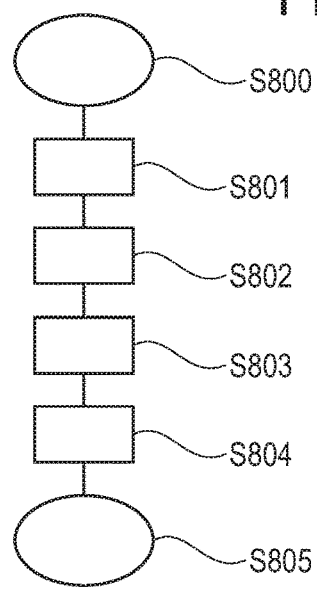
FIG. 8 is a flow chart for a method for actuating a motor according to an exemplary embodiment of the present invention.

FIG. 8 is a flow chart for a method for actuating a motor according to an exemplary embodiment of the present invention. The method for actuating a polyphase motor 140, M starts in the starting state S800.

In the state S801, a supply voltage $U_B$ is applied to a high terminal 102 of an actuating apparatus 100. In the state S802, a reference potential of the supply voltage $U_B$ is applied to a low terminal 103 of an actuating apparatus 100.

In the state S803, a pulse-width-modulated voltage pattern 402, 701*a*, 701*b*, 701*c*, 701*d*, 701*e* is impressed in four of the five phase terminals 111, 112, 113, 114, 115 of the actuating apparatus 100 by connecting the phase terminals 115, 112, 113, 114 to the high terminal 102 or the low terminal 103.

In the state S804, an evaluation signal which is dependent on the angle of rotation of the polyphase motor 140, M is detected in a fifth phase terminal 111. In addition, an angle of rotation and/or a commutation condition of the polyphase motor 140, M is determined from the evaluation signal.

The method ends at the end state S805.

In addition, it should be noted that the terms "comprising" and "having" do not exclude any other elements or steps and "a" or "an" does not exclude a plurality. Furthermore, it should be noted that features or steps which have been described with reference to one of the above embodiments, can also be used in combination with other features or steps of other above-described embodiments. Reference numerals in the claims should not be understood as limiting.

The invention claimed is:

1. An actuating apparatus for a polyphase motor, comprising:
   five phase terminals for connecting in each case a phase of the polyphase motor;
   a high terminal for applying a supply voltage ($U_B$);
   a low terminal for applying a reference potential of the supply voltage ($U_B$);
   a control device;
   wherein the control device is adapted, in one operational state, to impress a pulse-width-modulated voltage pattern in four of the five phase terminals by connecting the four phase terminals to the high terminal or the low terminal through at least two consecutive switching states, while switching a remaining fifth of the five phase terminals to passive for the at least two consecutive switching states, thereby producing an evaluation signal which is dependent on the angle of rotation of the polyphase motor in the remaining fifth of the five phase terminals; and
   wherein the control device is adapted to determine the angle of rotation and/or a commutation condition of the polyphase motor from the evaluation signal.

2. The actuating apparatus according to claim 1, further comprising a plurality of bridge branches, wherein each bridge branch is connected to precisely one of the five phase terminals in order to impress the pulse-width-modulated voltage pattern in the four of the five phase terminals.

3. The actuating apparatus according to claim 2, wherein each of the bridge branches comprises a series connection of a high switch and a low switch;
   wherein the high switch of each of the bridge branches is connected to the high-terminal;
   wherein the low switch of each of the bridge branches is connected to the low terminal-;
   wherein each of the five phase terminals is connected between the high switch and the low switch of the respective bridge branches.

4. The actuating apparatus according to claim 1, wherein the control device is adapted to impress the pulse-width-modulated voltage pattern in the four of the five phase terminals so as to connect half of the four phase terminals to the high terminal, and to connect another half of the four phase terminals to the low terminal.

5. The actuating apparatus according to claim 1, wherein the pulse-width-modulated voltage pattern is periodically passed through with a predetermined step duration during a predeterminable first time period (T1);
   wherein the pulse-width-modulated voltage pattern is adapted in such a way that connecting of the phase terminals to the high terminal or the low terminal per phase terminal is maintained substantially over two step durations of the pulse-width-modulated voltage pattern.

6. The actuating apparatus according to claim 1, wherein the evaluation signal has two sinusoidal voltage progressions having a phase shift of 90°.

7. The actuating apparatus according to claim 5, wherein the evaluation signal has a first sinusoidal voltage progression from a voltage differential between two temporally interrupted step durations of the impressed pulse-width-modulated voltage pattern.

8. The actuating apparatus according to claim 7, wherein the evaluation signal has a second sinusoidal voltage progression from a voltage differential between two additional non-contiguous step durations of the impressed pulse-width-modulated voltage pattern;
   wherein the two additional non-contiguous step durations have step durations of the pulse-width-modulated voltage pattern which are different from the step durations on which the first sinusoidal voltage progression is based.

9. The actuating apparatus according to claim 7, wherein the control device is adapted to determine the angle of rotation of the polyphase motor from the first sinusoidal voltage progression and the second sinusoidal voltage progression.

10. The actuating apparatus according to claim 1, wherein, after a predeterminable first time period, a phase terminal other than the first phase terminal is used to determine the evaluation signal.

11. The actuating device according to claim 1, further comprising:
    at least two additional phase terminals for connecting in each case one additional phase of the polyphase motor.

12. A motor control system, comprising:
    the actuating apparatus according to claim 1; and
    a motor having at least five phases;

wherein in each case one of the five phase terminals of the actuating apparatus is connected to one of the at least five phases.

13. A method for actuating a polyphase motor, comprising:
applying a supply voltage ($U_B$) to a high terminal of an actuating apparatus according to claim 1;
applying a reference potential of the supply voltage ($U_B$) to a low terminal of the actuating apparatus;
impressing a pulse-width-modulated voltage pattern in four of the five phase terminals of the actuating apparatus by connecting the phase terminals with the high terminal or the low terminal for at least two consecutive switching states while switching a fifth of the five phase terminals to passive for the at least two consecutive switching states;
detecting in the fifth phase terminal an evaluation signal which is dependent on the angle of rotation of the polyphase motor; and
determining an angle of rotation and/or a commutation condition of the polyphase motor from the evaluation signal.

* * * * *